United States Patent [19]

Tsuboi et al.

[11] Patent Number: 5,550,640
[45] Date of Patent: Aug. 27, 1996

[54] DIGITAL VIDEO SIGNAL RECORDING AND REPRODUCING APPARATUS AND METHOD FOR SETTING A NUMBER OF COMPRESSION BLOCKS ACCORDING TO DIFFERENT OPERATIONAL MODES

[75] Inventors: Yukitoshi Tsuboi, Yokohama; Masuo Oku, Kamakura; Masaru Takahashi, Yokohama; Kenji Ichige, Chigasaki, all of Japan

[73] Assignee: Hitachi, Ltd., Tokyo, Japan

[21] Appl. No.: 273,626

[22] Filed: Jul. 12, 1994

Related U.S. Application Data

[63] Continuation of Ser. No. 19,850, Feb. 19, 1993, abandoned.

[30] Foreign Application Priority Data

Feb. 19, 1992 [JP] Japan ..................................... 4-031757

[51] Int. Cl.$^6$ ........................................................ H04N 5/76
[52] U.S. Cl. ............................................. 358/335; 360/31
[58] Field of Search ..................................... 358/310, 335, 358/906, 909.1; 348/384, 390, 420; 360/33.1, 9.1, 39, 32, 48; H04N 5/76, 5/92, 9/79, 7/12, 3/32, 11/04, 5/275

[56] References Cited

U.S. PATENT DOCUMENTS

| | | | |
|---|---|---|---|
| 4,963,992 | 10/1990 | Doi et al. | 360/32 |
| 5,150,208 | 9/1992 | Otaka et al. | 358/133 |
| 5,164,831 | 11/1992 | Kuchta et al. | 358/909 |
| 5,175,631 | 12/1992 | Juri et al. | 358/310 |

FOREIGN PATENT DOCUMENTS

| | | |
|---|---|---|
| 469861 | 2/1992 | European Pat. Off. . |
| 4014744 | 11/1990 | Germany . |
| 2-117289 | 5/1990 | Japan . |

OTHER PUBLICATIONS

"An Experimental Study For A Home-Use Digital VTR", IEEE Transactions on Consumer Electronics, vol. 35, (Aug. 1989), pp. 450–457.

*Primary Examiner*—Thai Q. Tran
*Attorney, Agent, or Firm*—Antonelli, Terry, Stout & Kraus

[57] ABSTRACT

A digital video signal recording and reproducing apparatus and method wherein a basic block is constituted by a plurality of pixels of video signals. A picture data compressing unit effects data compression of the video signals so that a compression data quantity after data compression becomes a constant with respect to a compression block constituted by a plurality of the basic blocks, and the compressed data o the video signals are recorded on a data recording medium. A compression block setting sets a number of the basic blocks to constitute the compression block in response to different operation modes of the digital video signal recording and reproducing apparatus which are different in at least one of resolution of the video signals, recording time and data compression system, and controls the picture data compressing unit so that the number of the compression blocks of the video signals recorded on one track of the data recording medium after data compression by the picture data compressing unit becomes M in a first operation mode, where M is a positive integer, and the number of the compression blocks becomes a positive integer in each of the other operation modes.

17 Claims, 15 Drawing Sheets

VIDEO SIGNAL

FRAME

MACROBLOCK

DCT BLOCK

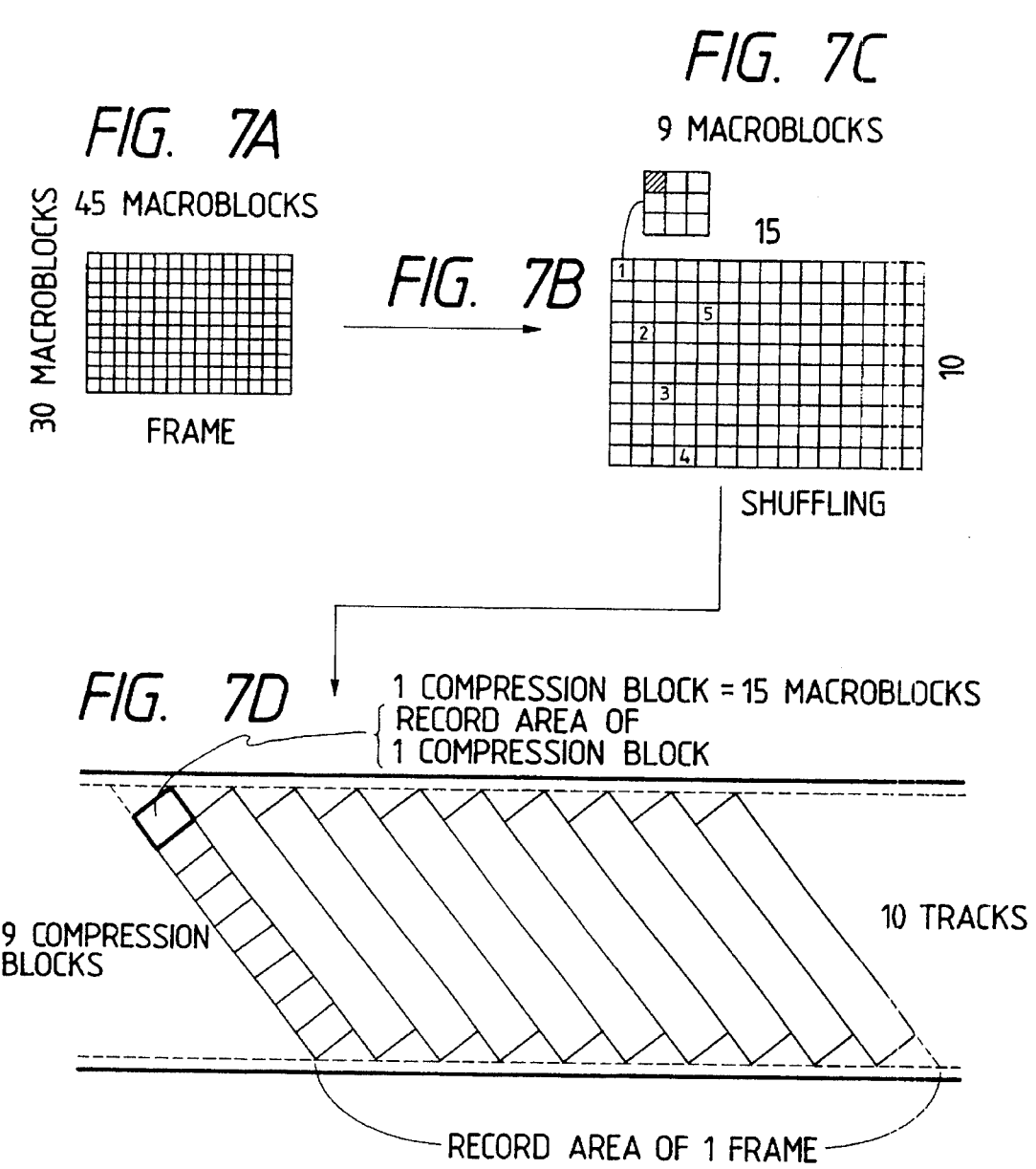

FIG. 8A
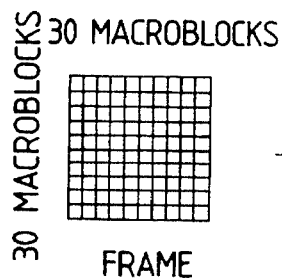
30 MACROBLOCKS / 30 MACROBLOCKS
FRAME
FIG. 8B →
FIG. 8C  9 MACROBLOCKS
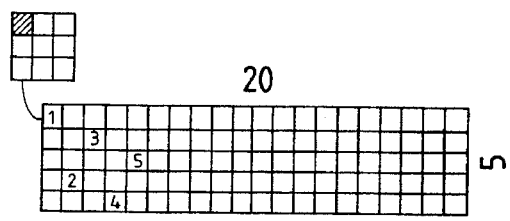
20 / 5
SHUFFLING
FIG. 8D
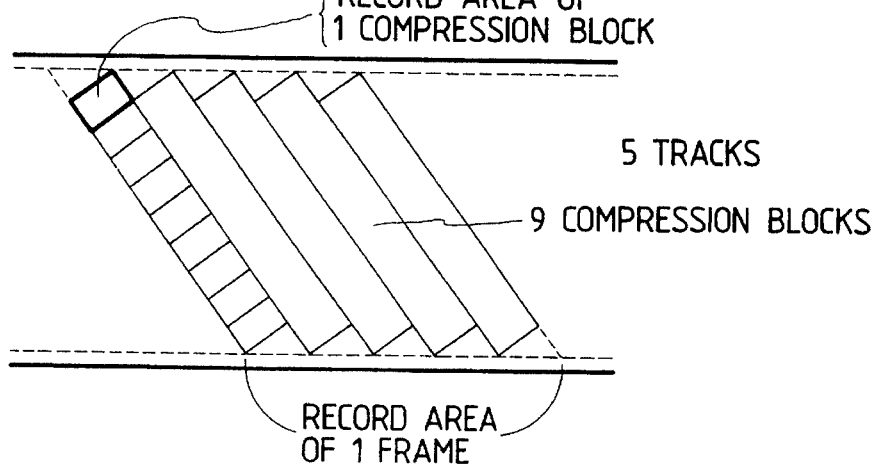
1 COMPRESSION BLOCK = 20 MACROBLOCKS
RECORD AREA OF 1 COMPRESSION BLOCK
5 TRACKS
9 COMPRESSION BLOCKS
RECORD AREA OF 1 FRAME

FIG. 9A 72 MACROBLOCKS
65 MACROBLOCKS
FRAME 26
20

FIG. 9C 9 MACROBLOCKS

SHUFFLING

1 COMPRESSION BLOCK = 26 MACROBLOCKS
RECORD AREA OF 1 COMPRESSION BLOCK

20 TRACKS

RECORD AREA OF 1 FRAME

9 COMPRESSION BLOCKS

45 MACROBLOCKS
30 MACROBLOCKS
FRAME

FIG. 11B →

27 MACROBLOCKS

SHUFFLING

1 COMPRESSION BLOCK = 5 MACROBLOCKS
RECORD AREA OF 1 COMPRESSION BLOCK

27 COMPRESSION BLOCK

10 TRACKS

RECORD AREA OF 1 FRAME

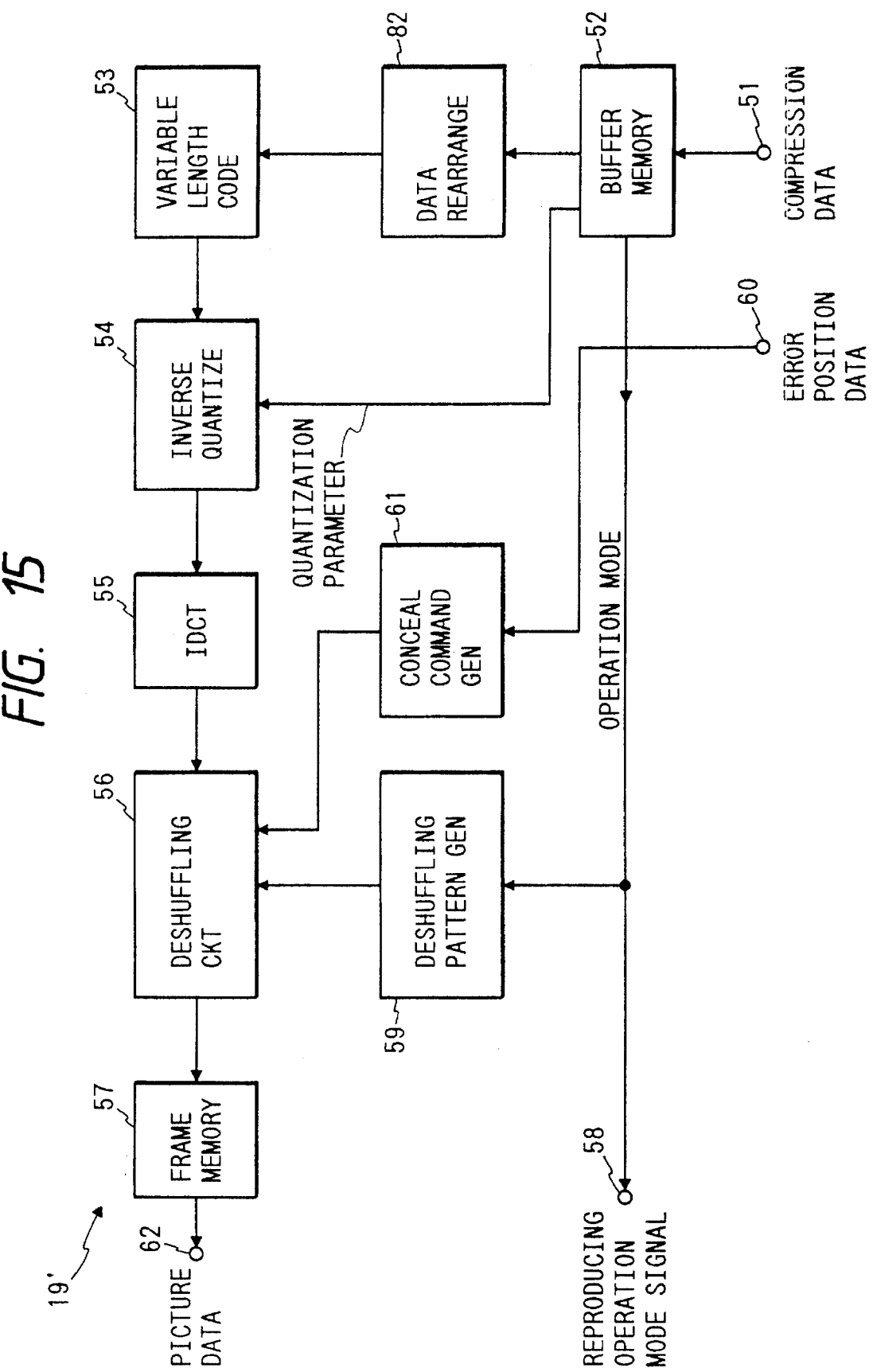

DIGITAL VIDEO SIGNAL RECORDING AND REPRODUCING APPARATUS AND METHOD FOR SETTING A NUMBER OF COMPRESSION BLOCKS ACCORDING TO DIFFERENT OPERATIONAL MODES

This application is a continuation application of Ser. No. 08/019,850, filed Feb. 19, 1993, now abandoned.

FIELD OF THE INVENTION

The present invention relates to a digital video signal recording and reproducing apparatus, hereinafter generally referred to as a "digital VTR" and a method which carries out data compression of video signals and records the compressed signals on a record medium such as a magnetic tape, and more particularly relates to a video record system for realizing a digital video signal recording and reproducing apparatus provided with a plurality of operation modes, such as plural sorts of video modes which are different in resolution or plural sorts of record modes which are different in picture quality and recording time.

A video recording system of a digital VTR which carries out data compression of video signals and records the compressed signals on a magnetic tape, for example, is described in IEEE Transactions on Consumer Electronics, Vol. 35, No. 3 (August 1989), pp. 450–457. This digital VTR carries out data compression of video signals with a one-frame total vertical line number of 525 and a frame frequency of 29.97 frame/second (hereinafter referred to as "525/60 system") and records the compressed signals on a magnetic tape, and reproduces the recorded data and carries out data decompression and outputs the video signals.

First, in recording of video signals, input video signals are converted from analog signals into digital picture data by A/D conversion, and the picture data are subjected to data compression by picture coding processing comprising discrete cosine transformation (DCT), quantization and variable length coding, and further an error correction code is added, and then the data are modulated and transformed into record signals and recorded on the magnetic tape. A rotary head carries out a helical scan of the magnetic tape so that signals are recorded along a track formed obliquely on the magnetic tape. Also in reproducing of video signals, reproduction signals reproduced from the magnetic tape are demodulated and the recorded data are restored, and detection of error and error correction at the time of error generation are carried out utilizing the added error correction code, and data decompression is carried out by picture decoding processing comprising variable length decoding, inverse quantization and inverse discrete cosine transformation (IDCT) and the picture data are produced, and then the digital picture data are converted into video signals which are analog signals and outputted by the D/A conversion.

The data quantity capable of being recorded per unit time on the magnetic tape is fixed, whereas the information quantity possessed originally by the picture data varies in response to variation of picture pattern per frame and per partial domain within the frame. Consequently, the information quantity control is carried out in that fineness of quantization in the picture coding processing is controlled and the compressed data quantity is made constant per a compression block comprising basic blocks of a prescribed number (basic unit of the picture coding processing). Also a method is utilized so that compressed data of one compression block are recorded to one synchronization block. The synchronization block is a basic unit of data record reproduction for the magnetic tape, and processings of error detection and error correction are carried out in this synchronization block unit.

If the compression block size is set too small, processing of information quantity control in the picture coding processing becomes simple, but it is difficult to avoid influence of variation of the information quantity possessed originally by the picture data and a large deterioration of the picture quality may occur locally by the result of the information quality control. Conversely, if the compression block size is set too large, influence of variation of the information quantity possessed originally by the picture data can be well removed and the picture quality is stabilized, but processing of the information quantity control fit to the aimed data quantity becomes difficult. Consequently, setting of the compression block size should be determined from equalization between the throughput of the information quantity control and the quality of the reproduced picture.

In the above-mentioned prior art, video signals in the 525/60 system are subjected to data compression and recorded and reproduced on a magnetic tape. An image record system of a digital VTR corresponding to plural types of video signal systems which are different in the resolution is disclosed in published EP application No. EP469861 (published Feb. 5, 1992). In this application, for plural types of video signal systems, after one frame is divided into segments in a multiple of 27, the compression data quantity is equalized in the segment unit and 27 segments per one track are recorded for any type of video signal system. The segment corresponds to the above-mentioned compression block, and compression block size in respective video signal systems is different.

For example, in video signals of the 525/60 system, one frame of effective domain 720 pixels×480 lines is divided into segments of 10×27 pieces and recorded on 10 tracks. Also in video signals of a high precision TV (HDTV) where one frame full vertical line number is 1125 lines and the frame frequency is 30 frame/second (hereinafter referred to as "1125/60 system", one frame of effective domain 1152 pixels×1080 lines and recorded on 20 tracks.

The effective display line number of video signals in the 1125/60 system originally is 1035 lines, but in the prior art as above described, 1080 lines are recorded and there is a useless state. Also when the size of the compression block (segment) is enlarged, influence of variation of the information quantity possessed originally by the picture data can be well removed and the picture quality is improved, but in order to realize the recording and reproducing of video signals of high picture quality, it is not entirely sufficient that $1/27$ size of one track is made the compression block size as in the prior art. Further in the prior art, there does not exist a long-time record mode being different from an ordinary record mode where data compression ratio is made high for prescribed video signals thereby the video record time is made long although the picture quality is slightly degraded.

SUMMARY OF THE INVENTION

It is therefore an object of the present invention to provide a digital video signal recording and reproducing apparatus and method which overcomes the problems of prior arrangements.

It is another object of the present invention to record and reproduce video signals of high picture quality efficiently by simple processing in a digital video signal recording and reproducing apparatus having plural sorts of operation modes, such as plural sorts of video modes which are different in resolution or plural sorts of record modes which are different in recording time.

According to a feature of the present invention, when the greatest common measure of the data quantity regarding images recorded on one track on the data recording medium such as a magnetic tape is defined as a reference data quantity, a compression block size in each operation mode is determined so that the number of compression blocks per the reference data quantity in each operation mode becomes the same or is related by a simple integer ratio. Here, the relation by a simple integer ratio means that when the number of the compression blocks in specific operation mode is made the basis, the number of the compression blocks in another operation mode j becomes Aj times (Aj is integer not less than 1) thereof. In a simple case wherein the data quantity regarding images recorded on one track is the same in all operation modes, the compression size in each operation mode may be determined so that the number of the compression blocks recorded on one track in each operation mode becomes the same or a simple integer ratio.

If the compression block size is set as above described, in any operation mode, since the compression data quantity per the compression block in the picture coding processing becomes the same or the simple integer ratio, the processing method such as error correction code adding to succeed the picture coding processing need not be changed in response to the operation mode. Here, the relation by the simple integer ratio means that when the data quantity per the compression block in specific operation mode is made the basis, the data quantity per the compression block in another operation mode j becomes 1/Aj times (Aj is integer not less than 1) thereof. As above described, the compression block size in the picture coding processing is changed in response to the operation mode and the control is carried out so that the compression data quantity per the compression block is made constant, thereby the processing method need not be changed regarding other processing and the recording and reproducing of video signals corresponding to all operation modes can be realized efficiently in simple processing. Further, since the present invention does not require that the number of compression blocks per the reference data quantity recorded on the data record medium in all operation modes must be the same (e.g., 27 per one track), the degree of freedom regarding setting of the compression block size in respective operation modes is high, and even when having plural sorts of operation modes, the recording and reproducing of video signals with high picture quality can be carried out efficiently.

These and other objects, features, and advantages of the present invention will become more apparent from the following description when taken in conjunction with the accompanying drawings which show, for purposes of illustration only, several embodiments of the present invention.

BRIEF DESCRIPTION OF THE DRAWINGS

FIGS. 7A–7D are explanation diagrams showing compression blocks of standard mode in a digital VTR according to the first embodiment;

FIGS. 8A–8D are explanation diagrams showing compression blocks of long time mode in a digital VTR according to the first embodiment;

FIGS. 9A–9D are explanation diagrams showing compression blocks of high precision mode in a digital VTR according to the first embodiment of the invention;

FIGS. 11A–11D are explanation diagrams showing compression blocks of standard mode in a digital VTR according to the second embodiment;

FIG. 15 is a detailed block diagram of a picture decoding circuit in a digital VTR according to the third embodiment of the invention;

DETAILED DESCRIPTION OF THE PREFERRED EMBODIMENTS

Figure 1:
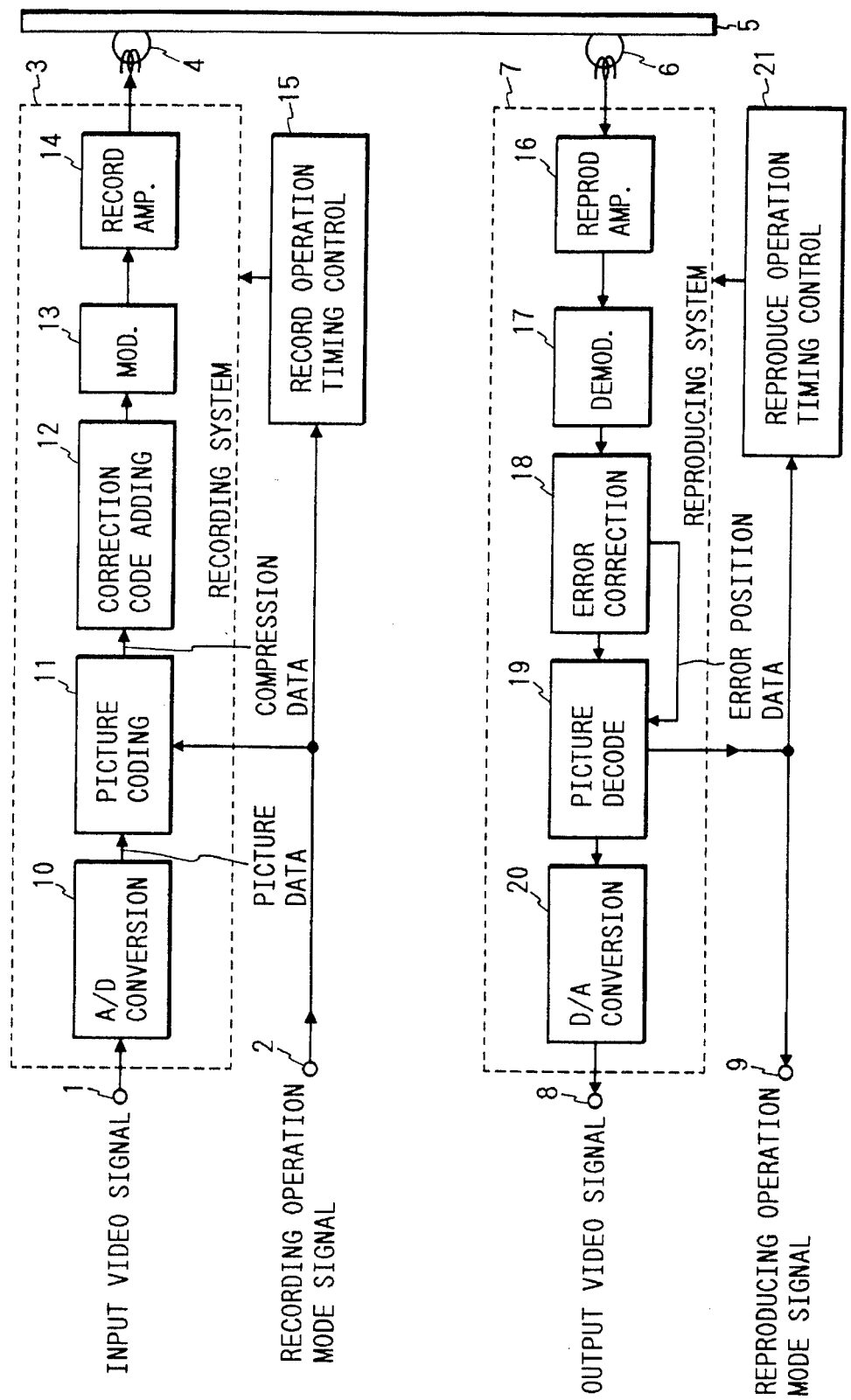
FIG. 1 is a block diagram of a digital video signal recording and reproducing apparatus as a digital VTR according to a first embodiment of the invention.

Referring now to the drawings wherein like reference numerals are utilized to designate like parts throughout the several views, FIG. 1 is a block diagram of a digital video signal recording and reproducing apparatus as a digital VTR of a first embodiment utilizing the video recording system of the present invention. In FIG. 1, there is provided an input terminal 1 for input video signals, an input terminal 2 for record operation mode signals, a recording system circuit 3, a recording head 4, a magnetic tape 5, a reproducing head 6, a reproducing system circuit 7, an output terminal 8 for output video signals, and an output terminal 9 for reproducing operation mode signals. The recording system circuit 3 comprises an A/D conversion circuit 10, a picture coding circuit 11, a correction code adding circuit 12, a modulation circuit 13, a recording amplifier 14 and a recording operation timing control circuit 15. The reproducing system circuit 7 comprises a reproducing amplifier 16, a demodulation circuit 17, an error correction circuit 18, a picture decoding circuit 19, a D/A conversion circuit 20 and a reproducing operation timing control circuit 21.

Table 1 is specification for three sorts of operation modes corresponding to the digital VTR. Here, the data quantity relating to images recorded on one track is the same in all operation modes.

TABLE 1

| specification | operation mode | | |
|---|---|---|---|
| | 1 standard mode | 2 long time mode | 3 high precision mode |
| frame frequency (unit:Hz) | 29.97 | 29.97 | 30 |
| sampling frequency (unit:MHz) | 13.5 | 9.0 | 44.55 |
| frame pixel number (unit: pixel) | 720 × 480 | 480 × 480 | 1152 × 1040 |
| frame record track number (unit:track) | 10 | 5 | 20 |
| macroblock pixel number (unit:pixel) | 16 × 16 | 16 × 16 | 16 × 16 |
| frame size (unit:macroblock) | 45 × 30 | 30 × 30 | 72 × 65 |
| compression block size (unit:macroblock) | 15 | 20 | 26 |
| intratrack compression block number (unit: compression block) | 9 | 9 | 9 |

The operation mode 1 is a standard mode where video signals in the 525/60 system which is the existing TV system in Japan are sampled by a sampling frequency of 13.5 MHz and compression data of one frame are recorded on 10 tracks on a magnetic tape. The operation mode 2 is a long-time mode where video signals in the 525/60 system are sampled by sampling frequency of 9.0 MHz (⅔ times of the standard mode) and compression data of one frame are recorded on 5 tracks (½ times of the standard mode) on a magnetic tape. Since the picture data compression rate is raised in comparison to the standard mode, the picture quality is slightly deteriorated, but the record time of two times can be realized by the same tape length. The operation mode 3 is a high precision mode where video signals with a one-frame whole vertical line number which is 1125 and a frame frequency of 30 frame/second (hereinafter referred to as "1125/60 system") are sampled by a sampling frequency of 44.55 MHz and compression data of one frame are recorded on 20 tracks (two times of the standard mode) on a magnetic tape. Although the record time in the same tape length becomes one half of the standard mode, this mode can record video signals of high precision in the 1125/60 system which is a next generation TV system in Japan.

At first, the operation of video recording will be described. Record operation mode signals set in the operation panel of the digital VTR are supplied to the input terminal 2, and in response to the record operation mode signals, the record operation timing control circuit 15 carries out control to change the operation timing with the operation clock of the A/D conversion circuit 10, the picture coding circuit 11, the correction code adding circuit 12, the modulation circuit 13 and the record amplifier 14 to constitute the record system circuit 3. First, video signals of one set in three sorts of signals, composed of a brightness signal (Y) and two sorts of color difference signals (R-Y, B-Y), are inputted as input video signals from the input terminal 1. The A/D conversion circuit 10 samples the analog video signals in a sampling frequency in response to the record operation mode which is set, and produces digital picture data. The picture coding circuit 11 carries out data compression of the picture data produced in the A/D conversion circuit 10, and produces compressed data. Data compression processing is carried out in each basic block of prescribed size, and the compression data quantity is controlled so as to be constant in a compression block unit comprising basic block in prescribed number determined in each operation mode. This changing of the compression block size in response to the operation mode is carried out in the picture coding circuit 11 in response to the record operation mode signal inputted from the input terminal 2. Also the operation mode information is multiplexed with the compressed data in the picture coding circuit 11.

Figure 2:
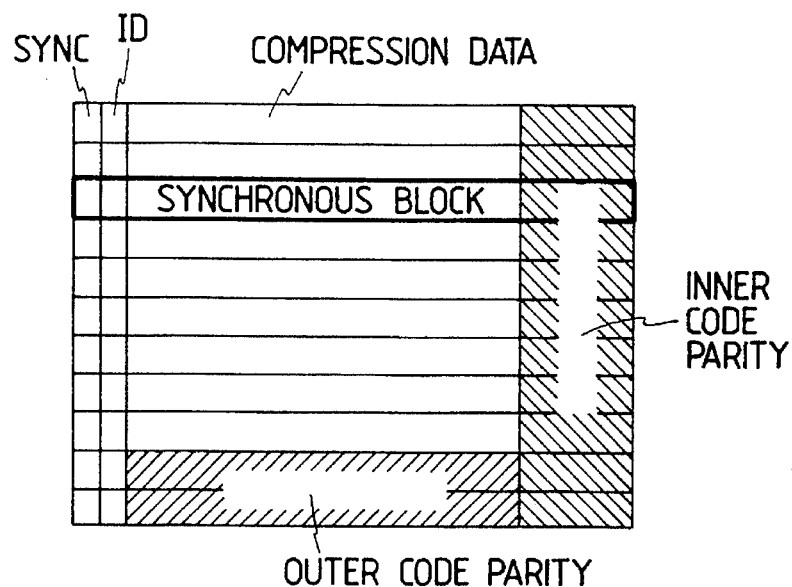
FIG. 2 is an explanation diagram of error correction code adding processing to compression data.

The correction code adding circuit 12 adds parity codes by a Reed-Solomon product code to the compressed data after being subjected to data compression in the picture coding circuit 11, and outputs data to be recorded onto the magnetic tape. FIG. 2 shows the structure of data outputted by the correction code adding processing circuit 12. First, compression data recorded on one track are divided per prescribed cycle and overlaid in the longitudinal direction, thereby a two-dimensionally arranged structure is produced. Outer code parity is added by the Reed-Solomon coding regarding the longitudinal or horizontal direction, and at the same time, an inner code parity is added by the Reed-Solomon coding also regarding the lateral or vertical direction. For compression data (or outer code parity) and inner code parity added thereto, SYNC data and ID data are added to the top to thereby constitute a synchronous block. The synchronous block is a basic unit of record reproduction of data for the magnetic tape. The SYNC data are represented as a special bit pattern to enable synchronization of reproduction when data are read out in the synchronous block unit from the magnetic tape. Also the ID data are attribute data indicating the synchronous block number or the like.

Figure 3:
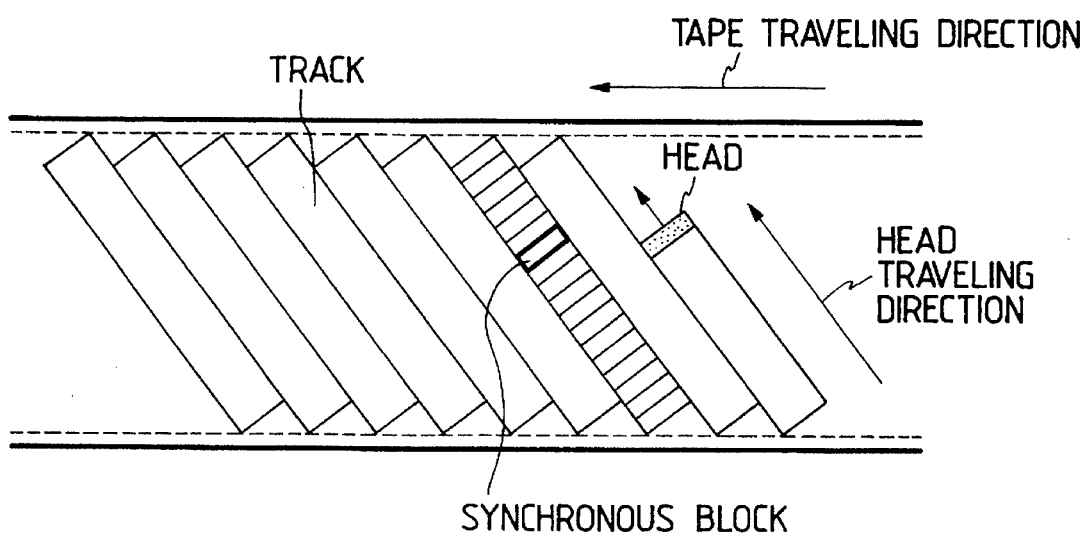
FIG. 3 is an explanation diagram showing data record pattern on a magnetic tape.

The modulation circuit 13 transforms compression data with error correction codes added thereto into a signal form suitable for record reproduction from the magnetic tape, and the recording amplifier 14 amplifies the signal and supplies it to the magnetic head 4. According to the processing in the record system circuit 3 as above described, video signals inputted in sequence to the input terminal 1 are recorded in sequence on the magnetic tape 5. FIG. 3 shows a data record pattern for the magnetic tape 5. In a manner similar to an existing analog VTR, by utilizing a magnetic head embedded in a rotary cylinder arranged at a slant to the tape traveling direction, the magnetic head carries out a helical scan of the magnetic tape wound on the rotary cylinder and carries effects the data recording. Consequently, data are recorded in the track unit having a prescribed slant onto the magnetic tape. Synchronous blocks produced in the error code adding circuit 12 are recorded in plural pieces on each track as illustrated.

Next, an operation of video reproduction will be described. First, signals recorded on the magnetic tape 5 are reproduced by the magnetic head 6, and the reproducing amplifier 16 amplifies the reproduced signals. The demodulation circuit 17 carries out waveform equalizing processing of compensate for the record reproducing characteristics of the magnetic tape, and then carries out demodulation processing to digital signals of 0 and 1. The error correction circuit 18 detects SYNC data of the special bit pattern added to the top of the synchronous block from the demodulated digital signals, thereby to obtain reproduced data in the synchronous block unit and carries out error detection and correction of random error utilizing the inner code parity and outputs the data as compressed data. Also when a burst error or a number of random errors are generated, after data of the synchronous block comprising the outer code parity are reproduced, error correction is carried out utilizing the outer code parity and the data are outputted as compressed data. When an error not capable of being corrected still remains, information of the error position is delivered as error position data to the picture decoding circuit 19.

According to the processing as above described, first, the synchronous block is reproduced in the operation timing with the operation clock of the standard mode and the compression data are outputted, and then the picture decoding circuit 19 reproduces the operation mode information which has been multiplexed with the compressed data and recorded on the magnetic tape, and the reproducing operation timing control circuit 21 carries out control to change the operation timing with the operation clocks of the reproducing amplifier 16, the demodulation circuit 17, the error correction circuit 18, the picture decoding circuit 19 and the D/A conversion circuit 20 to constitute the reproducing system circuit 7 in response to the reproducing operation mode signal. Also the reproducing operation mode signal is outputted from the output terminal 9 to the operation panel of the digital VTR, and an indication of which operation mode the video reproduction is being carried out is displayed.

The picture decoding circuit 19 carries out data decompression of the reproduced compression data, and reproduces the picture data. However, when there exists an error which could not be corrected by the error correction circuit 18, a decision is effected by the error position data delivered from the error correction circuit 18 regarding that the compression data of which basic block are erroneous, and decoding of the basic block is not carried out, but rather the data are replaced by the picture data of the basic block on the same picture surface position of the previous frame. According to this conceal processing, even when an error remains in the reproduced compression data, a large failure in the picture quality cannot occur in the reproduced image. The digital picture data reproduced in this manner are converted into analog video signals by the D/A conversion circuit 20, and then outputted as output video signals from the output terminal 8.

Figure 4:
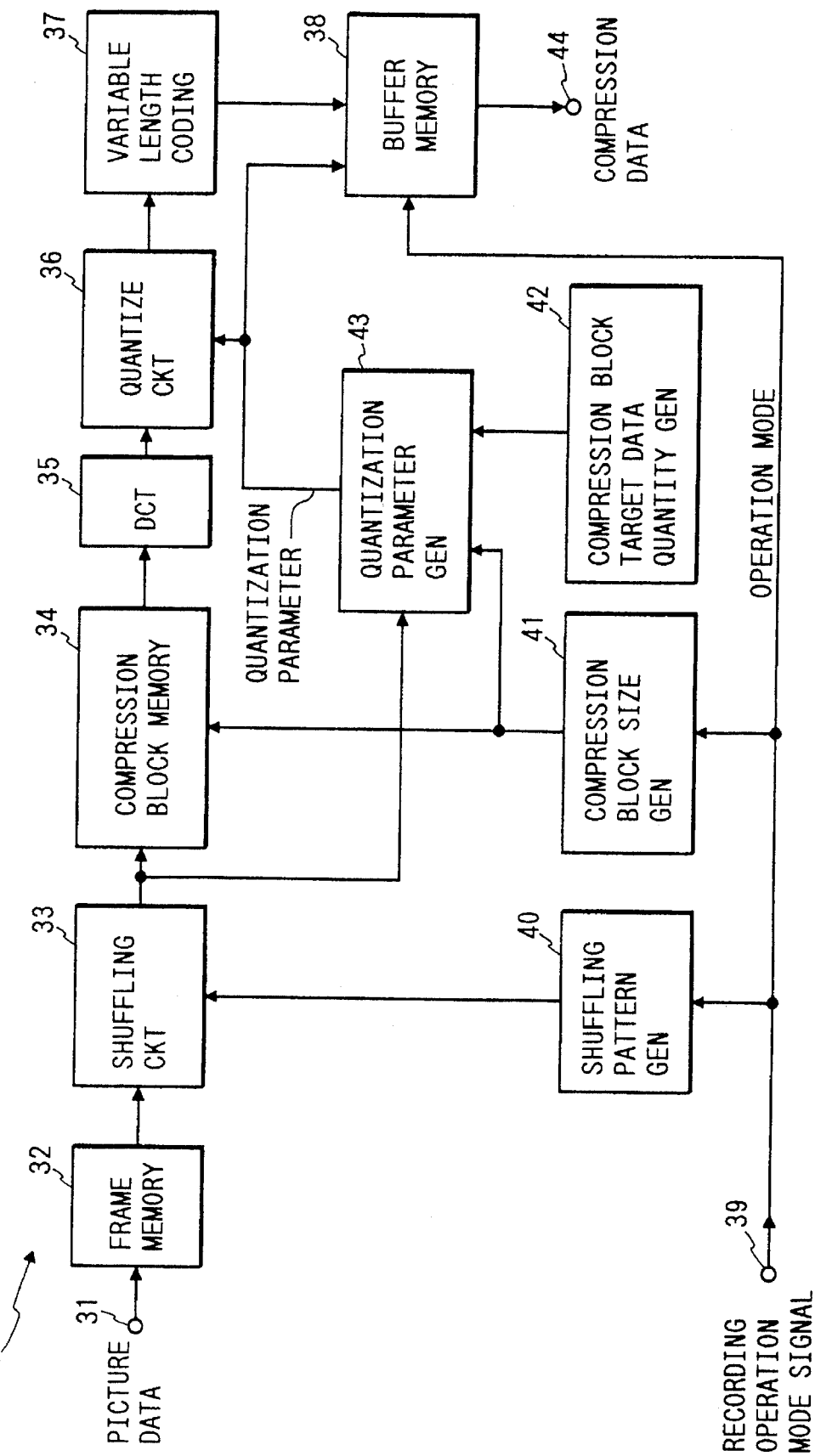
FIG. 4 is a detailed block diagram of a picture coding circuit in a digital VTR of FIG. 1.
Figure 5:
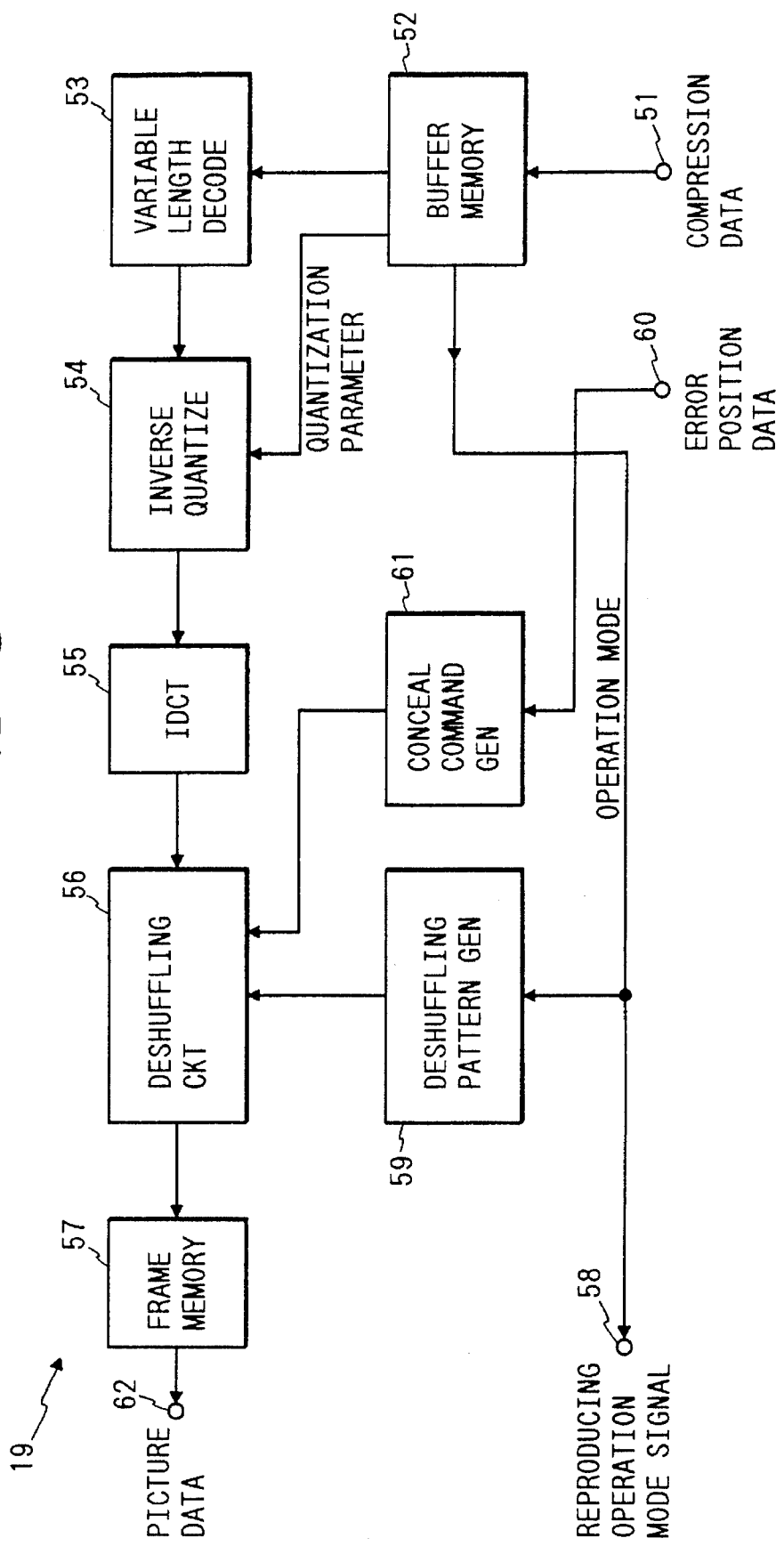
FIG. 5 is a detailed block diagram of a picture decoding circuit in a digital VTR of FIG. 1.

The operation of the picture coding circuit 11 and the picture decoding circuit 19 in the digital VTR shown in FIG. 1 will be described in detail with respect to FIGS. 4 and 5 wherein FIG. 4 is a detailed block diagram of the picture coding circuit 11, and FIG. 5 is a detailed block diagram of the picture decoding circuit 19. In the picture coding circuit 11 shown in FIG. 4, there is provided an input terminal 31 of picture data, a frame memory 32, designates a shuffling circuit 33, a compression block memory 44, a DCT circuit 35, a quantization circuit 36, a variable length coding circuit 37, a buffer memory 38, an input terminal 39 for recording operation mode signals, a shuffling pattern generating circuit 40, a compression block size generating circuit 41, a compression block target data quantity generating circuit 42, a quantization parameter generating circuit 43, and an output terminal 44 for compressed data. Also in the picture decoding circuit 19 shown in FIG. 5, there is provided an input terminal 51 for compressed data, a buffer memory 52, a variable length decoding circuit 53, an inverse quantization circuit 54, an IDCT circuit 55, a deshuffling circuit 56, a frame memory 57, an output terminal 58 for reproducing operation mode signals, a deshuffling pattern generating circuit 59, an input terminal 60 for error position data, a conceal command generating circuit 61, and an output terminal 62 for picture data.

Figure 6A:
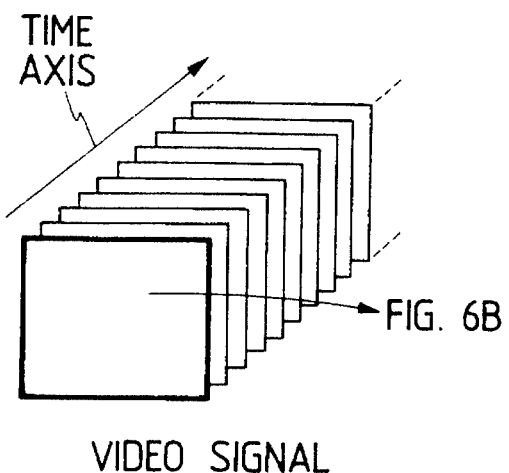
FIGS. 6A–6D are explanation diagrams showing stratous construction of picture data.
Figure 6B:
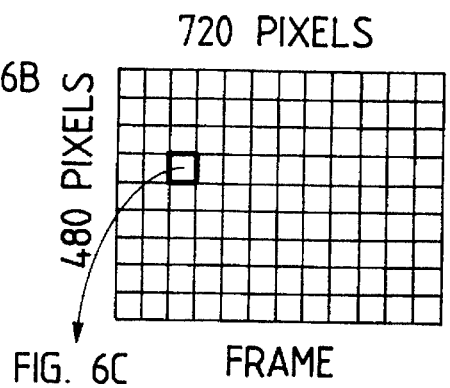
Figure 6C:
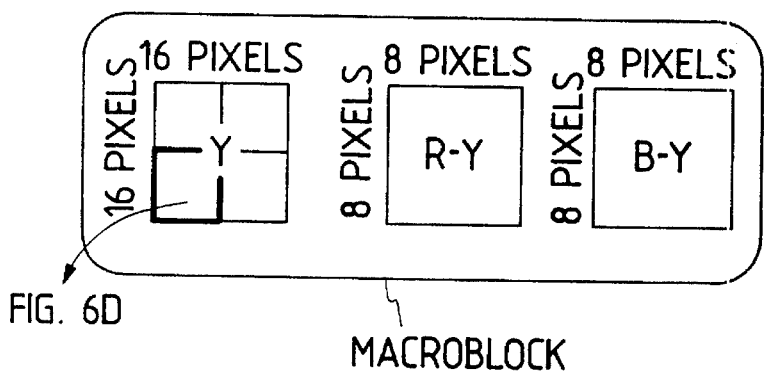
Figure 6D:
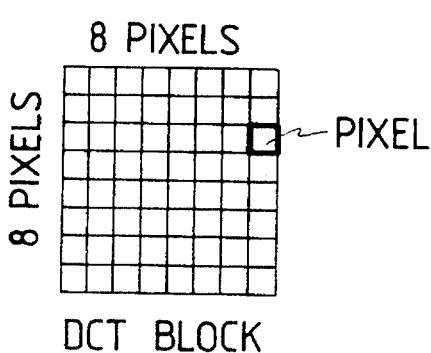
Figure 9B:
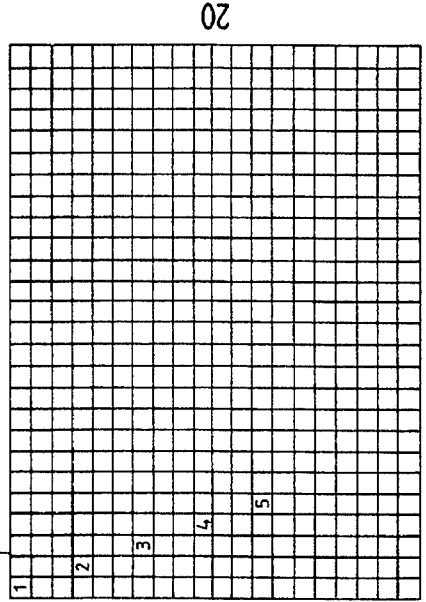
Figure 9D:
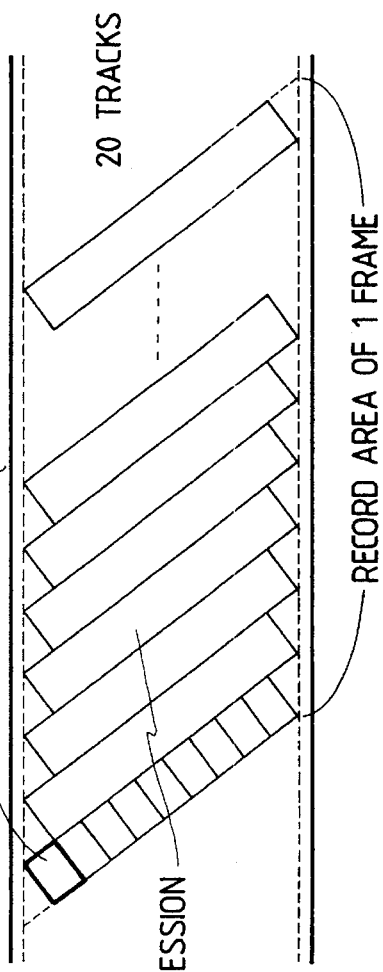

The operation of the picture coding circuit 11 will be described with reference to FIG. 4, it being noted that FIGS. 6A–6D show a stratous structure of picture data for the standard mode, but other modes provide a similar structure. In the standard mode, inputted images are constituted by picture planes of about 30 pieces per one second arranged in the time axis direction as shown in FIG. 6A, and each picture plane is called a frame. An actual video signal scans each frame in the horizontal direction from the left to the right, and then scans it from the upper side to the lower side in sequence. In the case of the standard mode, regarding the brightness signal (Y), one frame is constituted by horizontal 720 pixels×vertical 480 pixels as shown in FIG. 6B. Regarding the color difference signals (R-Y, B-Y), however, since they are sampled in the sampling frequency of ½ times of that of the brightness signal, the horizontal pixel number becomes 360 pixels which is one half with respect to the brightness signal. Also in the frame memory 32, since the decimation processing is carried out in the vertical direction ½ with respect to the color difference signal, the vertical pixel number becomes 240 pixels which is one half with respect to the brightness signal. The frame is divided into macroblocks, as shown in FIG. 6C, which is the basic unit of picture coding, and processing of picture coding is carried out. The size of the macroblock is common in all operation modes, and it is horizontal 16 pixels×vertical 16 pixels regarding the brightness signal (Y) and horizontal 8 pixels× vertical 8 pixels regarding the color difference signals (B-Y, B-Y). These blocks of three sorts of signals are assembled into a macroblock. Since processing of DCT is carried out in the DCT block unit of horizontal 8 pixels×vertical 8 pixels as shown in FIG. 6D, one macroblock is constituted by total 6 DCT blocks. That is, the brightness signal is constituted by 4 DCT blocks, and each of the two sorts of the color difference signals is constituted by one DCT block. As is apparent each compression block comprises a plurality of basic blocks wherein each basic block is in a two-dimensional arrangement of a predetermined number of pixels of a frame. For shuffling, adjacent basic blocks of a compression block are selected from non-adjacent two-dimensional arrangements of the predetermined number of pixels of the frame.

As shown in Table 1, the frame size (macroblock number per one frame) in the standard mode is 1350 macroblocks (horizontal 45 macroblocks×vertical 30 macroblocks). Also the frame size in the long time mode is 900 macroblocks (horizontal 30 macroblocks×vertical 30 macroblocks), and the frame size in the high precision mode is 4680 macroblocks (horizontal 72 macroblocks×vertical 65 macroblocks). Picture data inputted from the input terminal 31 are first stored in the frame memory 32 by one frame. However, the input picture data are data of the brightness signal and the two sorts of the color difference signals, and the horizontal pixel number of the color difference signal is one half of the brightness signal. Also in the frame memory 32, the decimation processing is carried out in the vertical direction ½ to the color difference signal.

The shuffling circuit 33 reads picture data by one frame held in the frame memory 32 in a macroblock unit, and outputs the read data by the number of the macroblocks determined in each operation mode to the compression block memory 34 and the quantization parameter generating circuit 43. However, macroblocks not in continuous picture plane positions, but in discrete picture plane positions are read and outputted in sequence. This is because when the compression data quantity is controlled to be constant in the compression block unit comprising macroblocks of the prescribed number, if the compression block is constituted by macroblocks in continuous picture plane positions, in the case that the picture content in the partial domain is a fine picture pattern, the picture data having a large information quantity originally are subjected to the data compression to the determined target data quantity and thereby a large deterioration of the picture quality will be produced. Conversely, in the case that the picture content in the partial domain is a flat picture pattern, the target data quantity being always constant is allocated to the picture data having a small information quantity originally and thereby wastefulness will occur. Therefore, in order that the information quantity of the picture data per the compression block is equalized as much as possible, the shuffling circuit 33 carries out the shuffling processing where the macroblocks in the discrete picture plane positions are taken out. Since the size of one frame is different in each operation mode, in response to the recording operation mode signal inputted from the terminal 39, the shuffling pattern generating circuit 40 changes the shuffling pattern to specify that the macroblock in which picture plane position should be taken in sequence, so as to control the shuffling circuit 33.

Picture data of macroblocks outputted from the shuffling circuit 33 are stored to the compression block memory 34 by the macroblock number determined in each operation mode. Since the compression block size is different in each operation mode, in response to the recording operation mode signal inputted from the input terminal 39, the compression block size generating circuit 41 changes the compression block size to indicate that the compression block is constituted by how many macroblocks, so as to control the compression block memory 34 and the quantization parameter generating circuit 43. As shown in Table 1, the compression block size in the standard mode is 15 macroblocks, the compression block size in the long time mode is 20 macroblocks, and the compression block size in the high precision mode is 26 macroblocks. In the standard mode, since the frame size is horizontal 45 macroblocks×vertical 30 macroblocks, one frame is constituted by 90 compression blocks. In the long time mode, since the frame size is horizontal 30 macroblocks×vertical 30 macroblocks, one frame is constituted by 45 compression blocks. Also in the high precision mode, since the frame size is horizontal 72 macroblocks×vertical 65 macroblocks, one frame is constituted by 180 compression blocks. In all operation modes, the number of the compression blocks recorded in one track is 9.

The quantization parameter generating circuit 43 calculates the activity of each macroblock to constitute the inputted compression block, and further a total sum is made the activity of the compression block. Here, the activity of the macroblock is indexed regarding the picture content of the macroblock to indicate whether the picture pattern is fine and the information quantity is large or the picture pattern is flat and the information quantity is small, and it is the total sum of the pixel dispersion value of the six DCT blocks which constitute the macroblock (square sum of pixel values by subtraction of the pixel mean value within the DCT block). When a specific quantization parameter is set, since the value of activity and the compression data quantity after the data compression have strong correlation statistically and also the quantization parameter and the compression data quantity after the data compression have strong correlation statistically to the specific activity value, regarding the macroblock having specific activity value, the quantization parameter necessary to control the compression data quantity to the target value can be estimated. Here, the quantization parameter is a parameter to indicate fineness of quantization. The quantization parameter generating circuit 43 allocates the compression block target data quantity (equal in all operation modes) obtained from the compression block target data quantity generating circuit 42 for each macroblock in response to a ratio of the activity of each block to the activity of the compression block. From the allocation target data quantity for each macroblock and the activity of the macroblock, the quantization parameter of the macroblock is determined and outputted to the quantization circuit 36.

After quantization parameters for each macroblock are generated in the quantization parameter generating circuit 43, picture data of the compression block held once in the compression block memory 34 are outputted in sequence from the compression block memory 34. The DCT circuit 35 carries out two-dimensional discrete cosine transformation (DCT) in the DCT block unit composed of horizontal 8 pixels×vertical 8 pixels for the picture data. The DCT carries out frequency analysis in a similar manner to a Fourier transformation, and the transformation coefficients of 64 pieces after the DCT are classified into DC coefficients corresponding to the pixel mean value within the DCT block and AC coefficients which are different in spatial frequency from low frequency to high frequency. The quantization circuit 36 quantizes the DCT blocks of 6 pieces within one macroblock by the same quantization parameter in response to the quantization parameter set in the macroblock unit. However, in consideration of human visual sensitivity characteristics that the detection sensitivity is lower for information of a high frequency than for information of low frequency, when a specific quantization parameter is given, an AC coefficient of low frequency in the transformation coefficients after the DCT carries out quantization relatively finely, and an AC coefficient of high frequency carries out quantization relatively coarsely. The fineness of quantization of the DC coefficients is always constant.

In the variable length coding circuit 37, AC coefficients quantized by the quantization circuit 36 are scanned from low frequency towards high frequency, and after a pair of the continuous number (run length) of coefficients having value of 0 and the value (level) of coefficients having value other than 0 is generated, the pair is subjected to Huffman coding into variable length codes according to a Huffman coding table previously determined. As the run length becomes shorter and the level becomes smaller, the generating probability of the pair becomes higher and thereby the code length corresponding to this becomes shorter, and in the reverse case, the code length becomes longer. However, the DC coefficient is treated separately from the AC coefficient, and allocation of the fixed length codes is carried out.

Further, the variable length coding circuit 37 rearranges the compression data of the macroblock which are variable length coded in the order of DC coefficients of all DCT blocks of 6 pieces, the minimum frequency AC coefficients which is variable length coded of all DCT blocks of 6 pieces to the maximum frequency AC coefficients. This is the processing to rearrange the compression data in the order from that of higher importance to that of lower importance. Moreover, in the quantization parameter generating circuit 43, the quantization parameter is determined so that the compression data quantity per one compression block is matched with the target data quantity, but the compression data quantity being actually generated includes slight error. Therefore the variable length coding circuit 37 cancels the compression data beyond the target data quantity in each compression block, and adds a dummy bit to the compression data which are insufficient reversely. The compression data which are variable length coded are stored by one compression block in the buffer memory 38, and then outputted as the compression data from the output terminal 44. However, the operation mode information and the quantization parameter of each macroblock are inputted also to the buffer memory 38 and multiplexed with the compression data.

As above described, in the picture coding circuit 11, the compression block size is determined and the compression data are generated, so that the number of the compression blocks recorded in one track becomes the same in all operation modes. Consequently, regarding processing of the correction code adding circuit 12 and so forth in the recording system circuit 3, the processing system need not be changed in response to the operation mode, but the operation clock and the operation timing only may be changed according to the control signal of the recording operation timing control circuit 15.

The operation of the picture decoding circuit 19 will be described with reference to FIG. 5. At first, the compression data inputted from the input terminal 51 are stored by one compression block in the buffer memory 52. The operation mode information multiplexed with the compression data is first extracted and outputted as a reproducing operation mode signal from the output terminal 58 and also supplied to the deshuffling pattern generating circuit 59. Further, the quantization parameters multiplexed in the macroblock unit are extracted and supplied to the inverse quantization circuit 54.

In the variable length decoding circuit 53, the compression data outputted from the buffer memory 52 are rearranged from the macroblock unit to the original order in the DCT block unit and then decoded in sequence according to the Huffman coding table, and after a pair of the run length and the level is generated and quantized, the value of the transformation coefficient is restored. In the inverse quantization circuit 54, inverse quantization is carried out in response to the quantization parameter of each macroblock, and the value of the transformation coefficient is restored. However, since the combination of the quantization processing and the inverse quantization processing is not reversible, the value before the quantization is not completely restored, but rather an error (distortion) of a certain degree is generated.

The IDCT circuit 55 carries out the inverse discrete cosine transformation (IDCT) in sequence in the DCT block unit for the transformation coefficient with the value restored, and reproduces the picture data. The deshuffling circuit 56 stores the picture data in the macroblock unit for the assigned picture plane position of the frame memory 57 according to the deshuffling pattern supplied from the deshuffling pattern generating circuit 59. The deshuffling pattern is changed and outputted in response to the reproducing operation mode signal in the deshuffling pattern generating circuit 59, and it is the same as the shuffling pattern which is changed and outputted in response to the recording operation mode signal in the shuffling pattern generating circuit 40 in the picture coding circuit 11. The picture data stored by one frame in the frame memory 57 are outputted as picture data in sequence from the output terminal 62.

The error position data generated in the error correction circuit 18 are inputted from the input terminal 60 to the conceal command generating circuit 61, and if an error exists in the compression data, the conceal command information is delivered to the deshuffling circuit 56 so as to indicate that the reproduced picture data of the macroblock including the error are invalid. In the deshuffling circuit 56, regarding the macroblock indicated by the conceal command information, the picture data of the reproduced macroblock are simply eliminated. Since the picture data of the macroblock are not written into the frame memory 57, as a result, the image data in the preceding frame remain. Thereby, even if an error is generated, significant picture deterioration can be avoided.

As above described, in the picture decoding circuit 19, the deshuffling pattern is changed in response to the operation mode and the picture data are reproduced. Regarding processing before the error correction circuit 18 in the reproducing system circuit 7, the processing system need not be changed in response to the operation mode, but the operation clock and the operation timing only may be changed according to the control signal of the reproducing operation timing control circuit 21.

Finally, setting of the compression block size in this embodiment will be summarized. FIGS. 7A–7D, FIGS. 8A–8D and FIGS. 9A–9D are explanation diagrams for the cases of the standard mode, the long time mode and the high precision mode, respectively. As shown in FIGS. 7A–7D, in the standard mode, the compression blocks of 90 pieces constituted by 15 macroblocks are generated from one frame constituted by horizontal 45 macroblocks×vertical 30 macroblocks. The compression data of 9 compression blocks are recorded in one track, and the compression data of one frame are recorded in 10 tracks. As shown in FIGS. 8A–8D, in the long time mode, the compression blocks of 45 pieces constituted by 20 macroblocks are generated from one frame constituted by horizontal 30 macroblocks×vertical 30 macroblocks. The compression data of 9 compression blocks are recorded in one track, and the compression data of one frame are recorded in 5 tracks. Further, as shown in FIG. 9A–9D, in the high precision mode, compression blocks of 180 pieces constituted by 26 macroblocks are generated from one frame constituted by horizontal 72 macroblocks×vertical 65 macroblocks. The compression data of 9 compression blocks are recorded in one track, and the compression data of one frame are recorded in 20 tracks.

As shown in FIGS. 7A–7D-9A–9D, the macroblocks corresponding to the number of the compression blocks recorded in one track are assembled in one, and the picture data of one frame are rearranged, if necessary, so that the macroblock assembly is arranged by a number equal to that of the macroblocks to constitute the compression blocks in the horizontal direction and by a number equal to that of the tracks allocated to recording of one frame in the vertical direction, and then the macroblocks of the prescribed number are selected and the compression blocks are constituted based on the shuffling pattern determined by the rule common in all operation modes. Thereby, a feature of the present invention is that the processing of shuffling and deshuffling becomes simple. First, any macroblock assembly in the column of the left end is selected in response to the compression block recorded in which number of a track among a plurality of tracks allocated to record of one frame. Next, the macroblock assembly in the position shifted by the prescribed offset in the vertical direction so as to avoid neighboring to the macroblock assembly already selected is selected in sequence from the right to the left in the horizontal direction. In this embodiment, the offset is made three. Thereby, the macroblock assemblies of the number corresponding to the compression block size are selected.

Finally any one macroblock among each macroblock assembly is selected in response to which number of the compression block be recorded in one track, thereby the compression block comprising the macroblocks of the prescribed number is constituted. In all operation modes, a feature of the present invention is that the compression block size in each operation mode is set, so that the number of the compression blocks recorded in one track becomes the same, i.e., 9 in the described embodiment.

The set values are determined as follows. In the operation mode j, one frame is constituted by macroblocks of Nj pieces, and the compression data of one frame are recorded on the Tj tracks on the magnetic tape. One frame is divided into the compression blocks (constituted by macroblocks of Lj pieces) of Mj pieces, and the compression data quantity is made constant using the compression block as a unit. Nj=Mj·Lj, and both Mj and Lj must be an integer. If the data quantity recorded in the track is constant, the number Mj of the compression blocks to constitute one frame in the operation mode j is determined, so that the number of the compression blocks recorded in one track becomes the same in all operation modes j, that is, the compression data quantity per the compression block becomes the same. Consequently, when a common divisor of the number Nj/Tj (must be an integer) of the macroblocks recorded in one track is made K, one frame is divided into the compression blocks of Mj (=K·Tj) pieces in the operation mode j, so that the number Mj/Tj (must be an integer) of the compression blocks recorded in one track becomes the same value K in all operation modes. The compression block size in the operation mode j becomes Lj=(Nj/Tj)/K.

In the case of this embodiment, the number of the macroblocks to constitute one frame in the standard mode (j=1), the long time mode (j=2), the high precision mode (j=3) is N1=1350, N2=900, N3=4680. Also the track number for the compression data of one frame to be recorded is T1=10, T2=5, T3=20. Then, the number of the macroblocks recorded in one track becomes N1/T1=135, N2/T2=180, N3/T3=234. Since the common divisor of the three numeric characters is 9, 3 and 1, the greatest common measure is taken in this embodiment and K=9. As a result, the number of the compression blocks to constitute one frame becomes M1=90, M2=45, M3=180, and the number of macroblocks to constitute one compression block is determined to be L1=15, L2=20, L3=26.

In this embodiment, although the number of the compression blocks recorded in one track is made K=9, it may be made K=3 or K=1. If K=3, the number of the compression blocks to constitute one frame becomes M1=30, M2=15, M3=60, and the number of the macroblocks to constitute one compression block becomes L1=45, L2=60, L3=78. Also if K=1, the number of the compression blocks to constitute one frame becomes M1=10, M2=5, M3=20, and the number of the macroblocks to constitute one compression block becomes L1=135, L2=180, L3=234. The compression block size is determined from the equilibrium of the complexity of the information quantity control in the picture coding processing and the picture quality obtained by the picture decoding processing.

Figure 10:
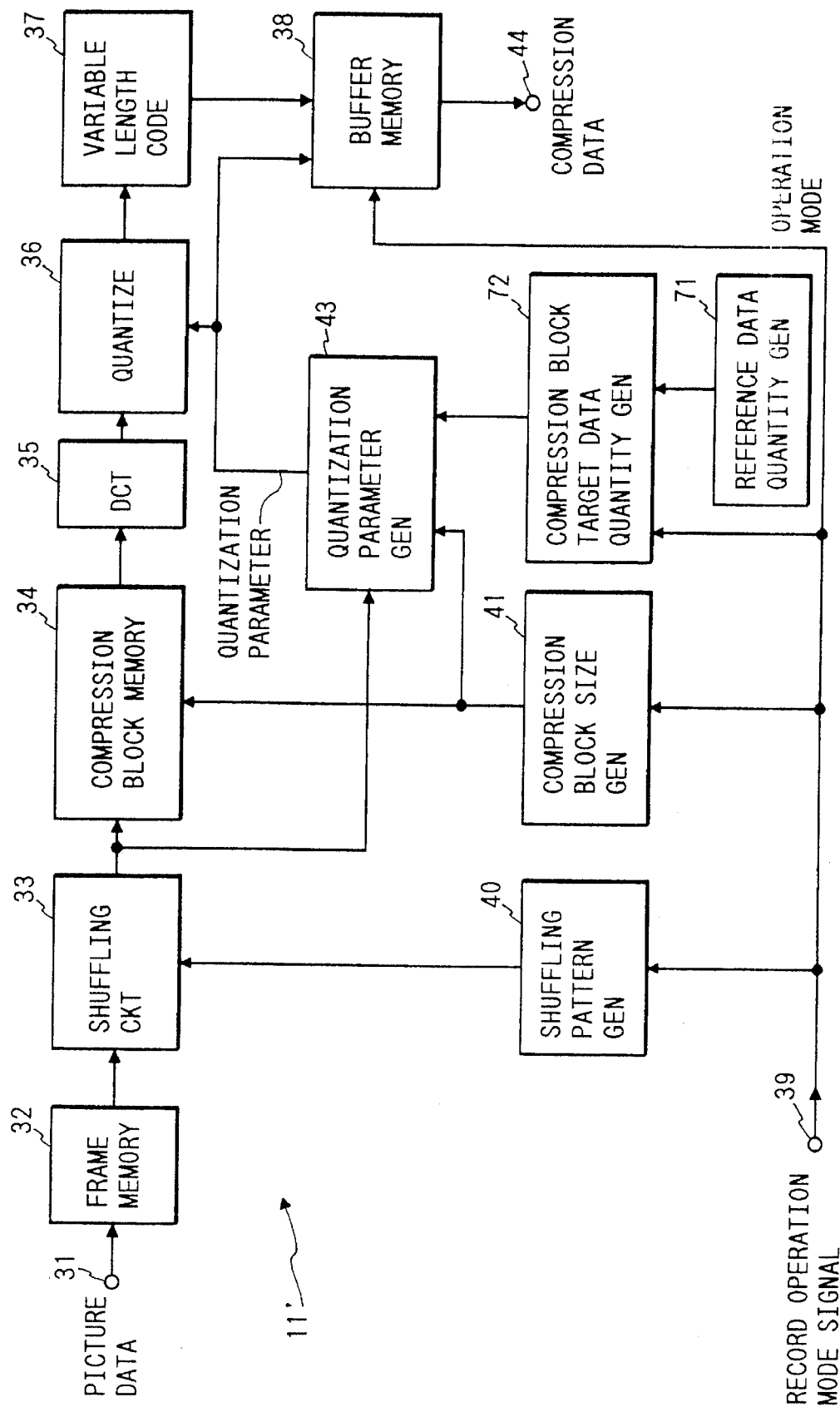
FIG. 10 is a detailed block diagram of a picture coding circuit in a digital VTR according to a second embodiment of the invention.
Figure 11A:
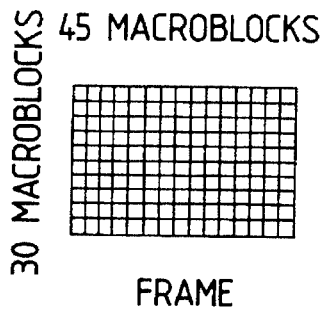
Figure 11C:
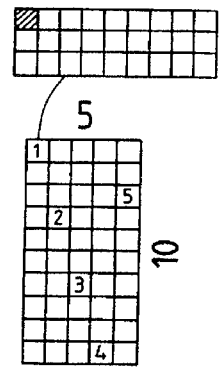
Figure 11D:
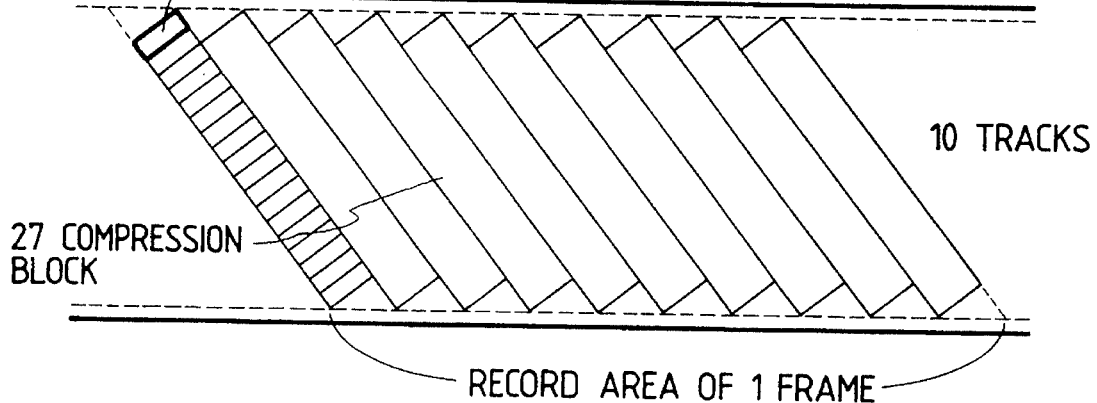

A second embodiment of the present invention will be described with reference to FIG. 10. Regarding the specification of the three sorts of the operation modes, this embodiment is different from the previously described first embodiment only in the compression block size and the intratrack compression block number in the standard mode. The compression block size in the standard mode is 5 macroblocks which is ⅓ times of 15 macroblocks in the previous embodiment. Also the intratrack compression block number in the standard mode is 27 compression blocks which is three times of 9 compression blocks in the first embodiment. The entire construction of the digital VTR in this embodiment is the same as the case in the previous embodiment shown in FIG. 1, but the construction of the picture coding circuit 11 in the recording system circuit 3 is different. The construction of the picture decoding circuit 19 in the reproducing system circuit 7 is the same as the case in the previous embodiment shown in FIG. 5. FIG. 10 is a detailed block diagram of the picture coding circuit 11'.

In the picture coding circuit 11' shown in FIG. 10, there is provided an input terminal 31 for picture data, a frame memory 32, a shuffling circuit 33, a compression block memory 34, a DCT circuit 35, a quantization circuit 36, a variable length coding circuit 37, a buffer memory 38, an input terminal 39 for recording operation mode signals, a shuffling pattern generating circuit 40, a compression block size generating circuit 41, a quantization parameter generating circuit 43, an output terminal 44 for compression data, a reference data quantity generating circuit 71, and a compression block target data quantity generating circuit 72. The construction of circuit blocks except for the reference data quantity generating circuit 71 and the compression block target data quantity generating circuit 72 is the same as the case in the first embodiment shown in FIG. 4.

The shuffling pattern generating circuit 40 and the compression block size generating circuit 41 carry out operations which are slightly different from the case in the embodiment of FIG. 1. That is, when the operation mode is the standard mode, the shuffling pattern generating circuit 40 outputs shuffling patterns corresponding to the compression block size which is 5 macroblocks, and the compression block size generating circuit 41 outputs the 5 macroblocks as the compression block size. Also the reference data quantity generating circuit 71 outputs the reference value (same in all operation modes) of the compression block target data quantity generating circuit 72 divides the reference value by a prescribed integer in response to the operation mode, and generates the compression block target data quantity and outputs it. The reference value is the compression block target data quantity itself in the long time mode and the high precision mode, and in the standard mode, the reference value is multiplied by ⅓ and the compression block target data quantity is generated. The operation in other circuit blocks is the same as the case in the first embodiment.

FIGS. 11A–11D provide an explanation diagram showing setting of the compression block size in the standard mode. In the cases of the long time mode and the high precision mode, the second embodiment is entirely same as the first embodiment, setting of respective compression sizes is shown in FIGS. 8A–8D and FIGS. 9A–9D. The compression blocks recorded on one track in the long time mode and the high precision mode are 9 in number, and the compression blocks recorded on one track in the standard mode are 27 in number. Thus in all operation modes, a feature of the present invention is that the compression block size in each operation mode is set so that the number of the compression blocks recorded to one track becomes an integer times of the prescribed value (9).

The set values are determined as follows. In the operation mode j, one frame is constituted by macroblocks of Nj pieces, and the compression data of one frame are recorded on Tj tracks on the magnetic tape. One frame is divided into the compression blocks (constituted by macroblocks of Lj pieces) of Mj pieces, and the compression data quantity is made constant using the compression block as a unit.

Nj=Mj·Lj, and both Mj and Lj must be an integer. If the data quantity recorded on one track is constant, the number Mj of the compression blocks to constitute one frame in the operation mode j is determined, so that the number of the compression blocks recorded on one track in all operation modes j becomes an integer times of a prescribed value, that is, the compression data quantity in one compression block becomes a reference value divided by integer. Consequently, when common divisor of the number Nj/Tj (must be an integer) of the macroblocks recorded on one track is made K, one frame is divided into the compression blocks of Mj (=K·Aj·Tj) pieces in the operation mode j, so that the number Mj/Tj (must be an integer) of the compression blocks recorded on one track becomes integer times (Aj times) of the prescribed value K in all operation modes and becomes equal to K at least in one operation mode. The compression block size in the operation mode j becomes Lj=(Nj/(Aj·Tj))/K.

In the case of this embodiment, the number of the macroblocks to constitute one frame in the standard mode (j=1), the long time mode (j=2), the high precision mode (j=3) is N1=1350, N2=900, N3=4680. Also the track number for the compression data of one frame to be recorded is T1=10, T2=5, T3=20. Then the number of the macroblocks recorded on one track becomes N1/T1=135, N2/T2=180, N3/T3=234. Since the common divisor of the three numeric characters is 9, 3 and 1, the greatest common measure is taken in this embodiment and K=9, and a coefficient multiplied by K is made A1=3, A2=1, A3=1. As a result, the number of the compression blocks to constitute one frame becomes M1=270, M2=45, M3=180, and the number of the macroblocks to constitute one compression block is determined to be L1=5, L2=20, L3=26.

In this embodiment, although the value to become the basis of the number of the compression blocks recorded on one track is made K=9, it may be made K=3 or K=1. As the coefficient Aj multiplied to K, another value may be used. For example, in this embodiment, although the coefficient multiplied by K=9 in the standard mode (j=1) is made A1=3, another value of A1=5 or A1=15 may be used so that the number of the compression blocks recorded on one track becomes divisor of the number N1/T1=135 of the macroblocks recorded on one track. If K=3, A1(=3, 5, 9, 15) or 45 is suitable, and if K=1, A1(=3, 5, 9, 15, 27, 45 or 135) is suitable. The compression block size is determined from the equilibrium of the complexity of the information quantity control in the picture coding processing and the picture quality obtained by the picture decoding processing.

Figure 12:
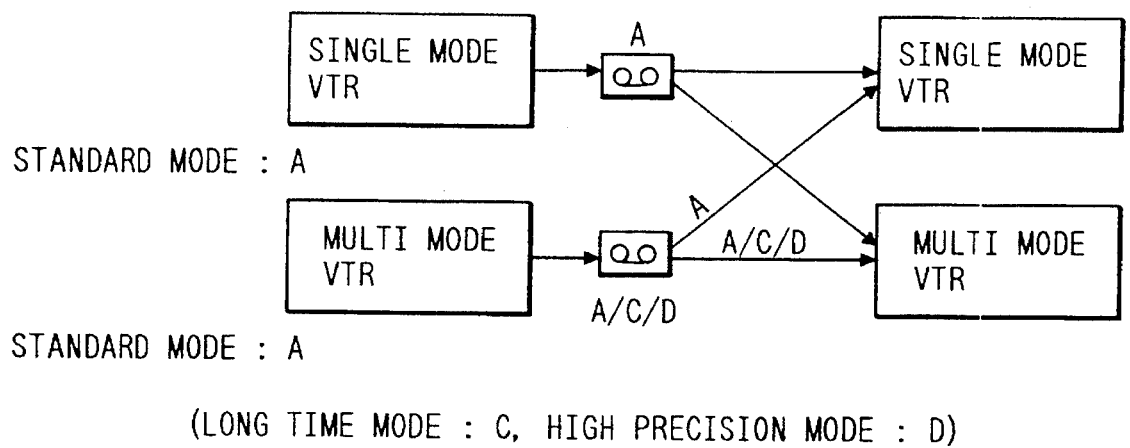
FIG. 12 is a diagram indicating compatibility relating to a digital VTR according to the second embodiment.

The digital VTR using the video recording system of the second embodiment is designed so as to have the upper compatibility to the digital VTR of a single mode corresponding to the standard mode only. In the single mode VTR, the compression block size is set as small as the 5 macroblocks, and the information quantity control in the picture coding processing is simple and the circuit scale is small. FIG. 12 shows a diagram explaining the compatibility. The video recording system of the single mode VTR having the standard mode only is the system A (compression block size: 5 macroblocks), and the video recording system of the multi mode VTR is the system A in the standard mode, the system C in the long time mode, and the system D in the high precision mode. First, the image recorded in the single mode VTR (system A) can be reproduced in the standard mode (system A) of the multi mode VTR. Conversely, the image in the standard mode (system A) among the images recorded in the multi mode VTR (system A/C/D) can be reproduced in the single mode VTR (system A).

Figure 13:
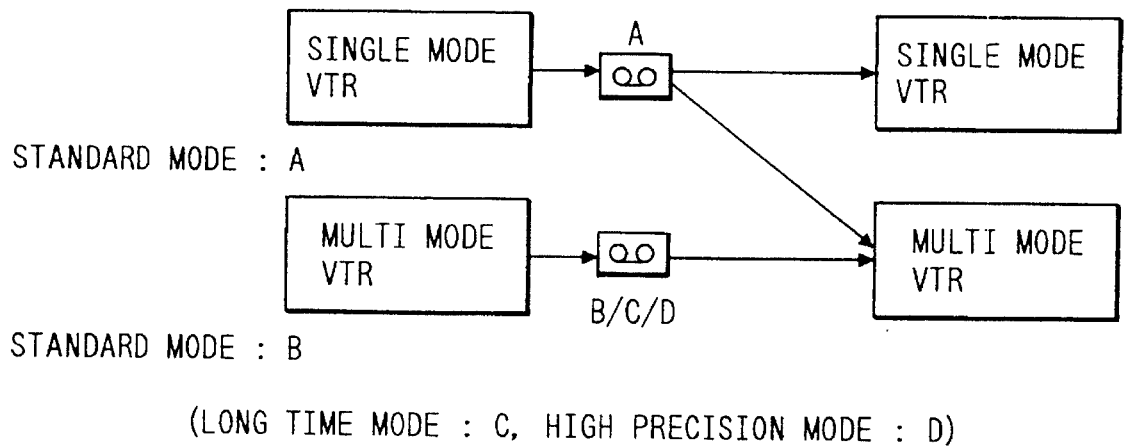
FIG. 13 is a diagram indicating compatibility relating to a digital VTR according to the first embodiment.

The digital VTR using the video record reproducing system in the first embodiment has the compatibility in one direction to the digital VTR of a single mode. FIG. 13 shows a diagram explaining the compatibility. The video recording system of the single mode VTR having the standard mode only is the system A (compression block size: 5 macroblocks), and the video recording system of the multi mode VTR is the system B (compression block size: 15 macroblocks) in the standard mode, the system C in the long time mode, and the system D in the high precision mode. Since the compression block size in the standard mode of the multi mode VTR (system B) is 15 macroblocks and just three times of the 5 macroblocks in the single mode VTR (system A), the 3 compression blocks in the single mode VTR can be treated as one compression block in the multi mode VTR. On the contrary, the image recorded in the multi mode VTR (system B/C/D) cannot be reproduced in the single mode VTR, even if it is the image in the standard mode (system B). Since the compression data quantity is made constant in the unit of the 15 macroblocks in the standard mode of the multi mode VTR (system B), in the single mode VTR (system A) assuming that the compression data quantity is made constant in the unit of the 5 macroblocks, the compression data by the 5 macroblocks cannot be read and reproduced normally.

Figure 14:
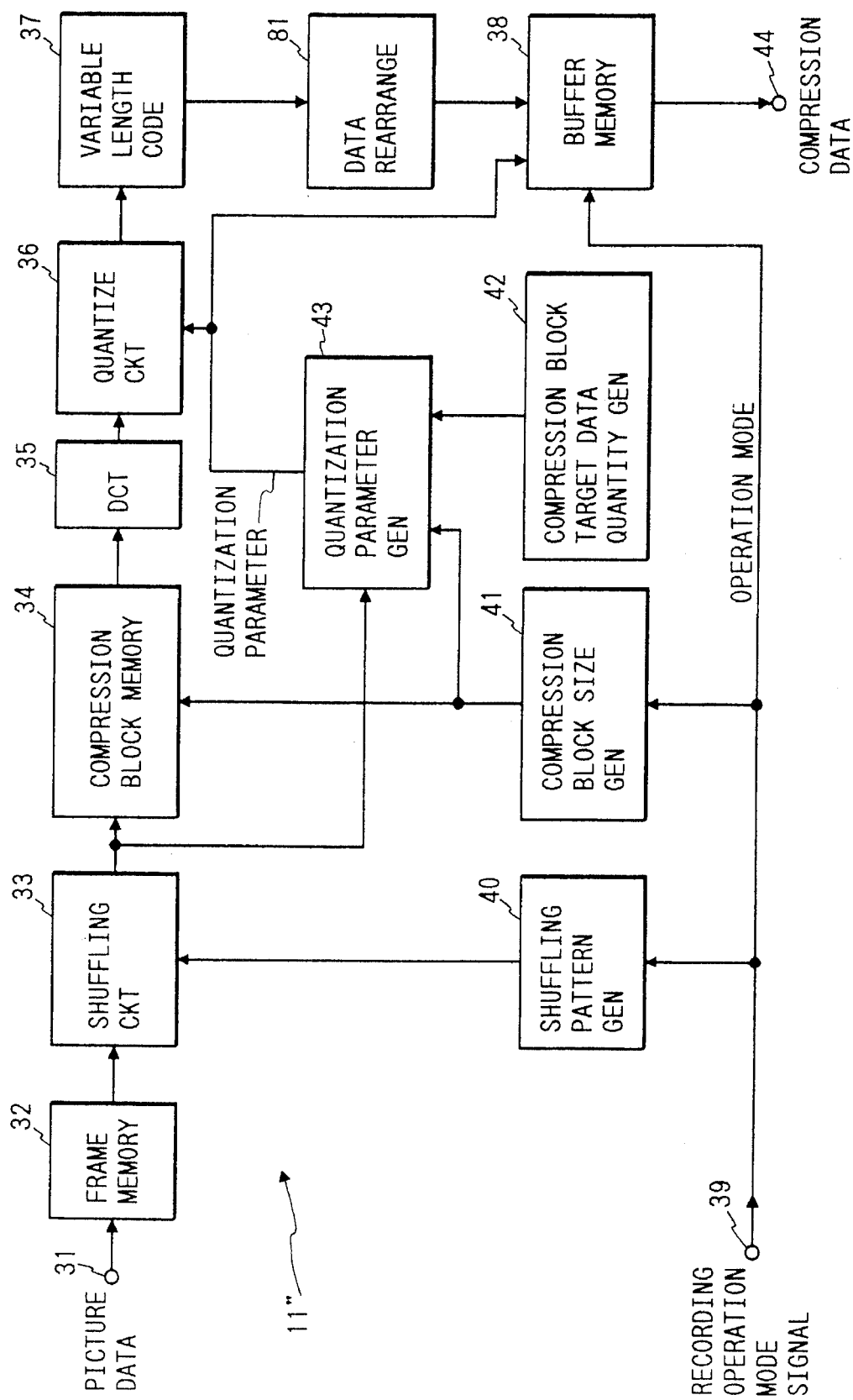
FIG. 14 is a detailed block diagram of a picture coding circuit in a digital VTR according to a third embodiment of the invention.

A further or third embodiment of the present invention will be described referring to FIGS. 14 and 15 wherein the first embodiment is further modified. A digital VTR according to this embodiment has upper compatibility to a single mode digital VTR in similar manner to the second embodiment. Setting of the compression block size in this embodiment is quite similar to the case of the first embodiment. The entire construction of the digital VTR in this embodiment is the same as the case in the first embodiment, but the construction of the picture coding circuit 11 in the recording system circuit 3 and the construction of the picture decoding circuit 19 in the reproducing system circuit 7 are different. FIG. 14 is a detailed block diagram of the picture coding circuit 11", and FIG. 15 is a detailed block diagram of the picture decoding circuit 19'.

In the picture coding circuit 11" shown in FIG. 14, there is provided an input terminal 31 for picture data, a frame memory 32, a shuffling circuit 33, a compression block memory 34, a DCT circuit 35, a quantization circuit 36, a variable length coding circuit 37, a buffer memory 38, an input terminal 39 for recording operation mode signals, a shuffling pattern generating circuit 40, a compression block size generating circuit 41, a compression block size target data quantity generating circuit 42, a quantization parameter generating circuit 43, an output terminal 44 for compression data, and a data rearrangement circuit 81. The construction and operation of circuit blocks except for the data rearrangement circuit 81 are the same as the case of the picture coding circuit 11 in the first embodiment.

This embodiment is different from the first embodiment in that the data rearrangement circuit 81 is inserted between the variable length coding circuit 37 and the buffer memory 38. The data rearrangement circuit 81 carries out data rearrangement in the standard mode as follows. In the long time mode and the high precision mode, however, the data rearrangement processing is not carried out, but the inputted compression data are outputted intact. First, the 15 macroblocks to constitute one compression block are divided into the macroblock groups of 3 pieces per the 5 macroblocks. One macroblock group corresponds to one compression block in the single mode digital VTR. The record area of the compression data in one compression block is also divided equally in three per each macroblock. The data rearrangement circuit 81 rearranges the compression data of each macroblock group to the corresponding record area in filling form from that having higher importance.

In the picture decoding circuit 19' shown in FIG. 15, there is provided an input terminal 51 for compression data, a buffer memory 52, a variable length decoding circuit 53, an inverse quantization circuit 54, an IDCT circuit 55, a deshuffling circuit 56, a frame memory 57, an output terminal 58 for reproducing operation mode signals, a deshuffling pattern generating circuit 59, an input terminal 60 for error position data, a conceal command generating circuit 61, an output terminal 62 for picture data, and a data rearrangement circuit 82. The construction of circuit blocks except for the data rearrangement circuit 82 is the same as the case of the picture decoding circuit 19 in the first embodiment shown in FIG. 5.

This embodiment is different from the first embodiment in that the data rearrangement circuit 82 is inserted between the buffer memory 52 and the variable length decoding circuit 53. The data rearrangement circuit 82 carries out inverse processing to the above-mentioned processing carried out by the data rearrangement circuit 81 in the picture coding circuit 11", and it rearranges the compression data of each compression block into the original form in the standard mode. Thereby, in any operation mode, the compression data are subjected to the data decompression normally and the picture data are reproduced.

Figure 16A:
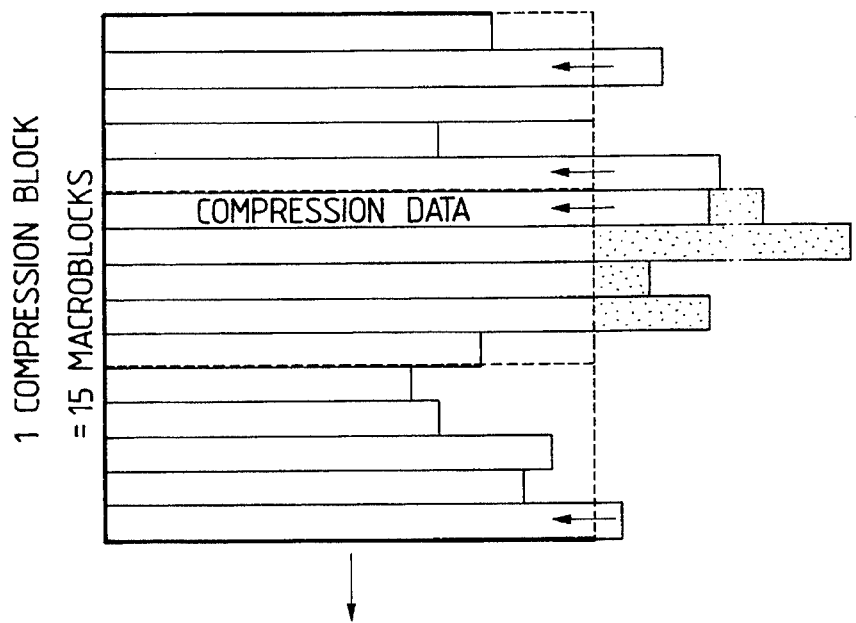
FIGS. 16A and 16B are explanation diagrams for compression data rearrangement processing of compression blocks in a digital VTR according to the third embodiment.
Figure 16B:
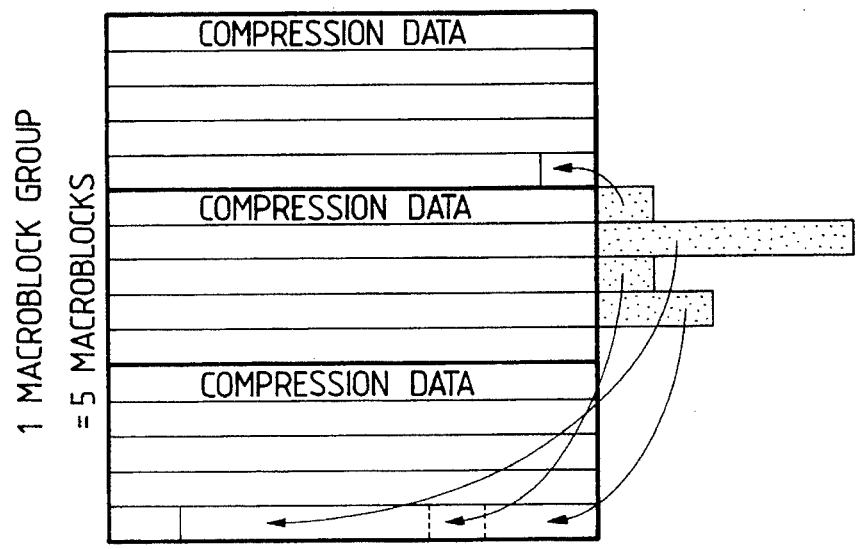

FIGS. 16A and 16B show a state of the data rearrangement in the standard mode. The compression data quantity of one compression block composed of the 15 macroblocks is constant, but the compression data quantity per a macroblock is varied and the compression data quantity of one macroblock group composed of the 5 macroblocks is varied in a certain degree. First, among the compression data of each macroblock group, a decision is effected regarding the compression data which cannot be recorded in the record area corresponding to the macroblock group but are recorded to a record area corresponding to another macroblock group. The tail of the compression data of each macroblock may overflow. A darkened portion in FIGS. 16A and 16B represents the compression data overflowing. Next, the compression data overflowing from the record area corresponding to each macroblock group are filled to an empty domain remaining in the record area corresponding to another macroblock group and FIG. 16B shows this state.

Figure 17:
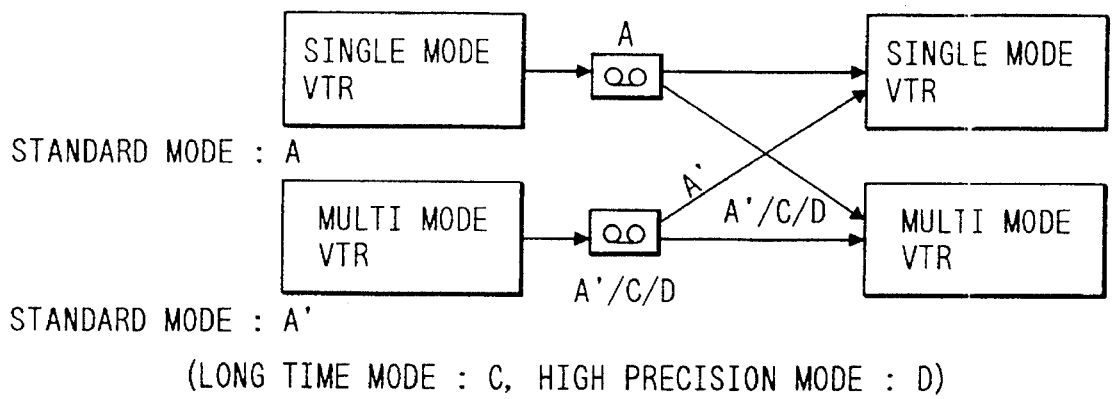
FIG. 17 is a diagram indicating compatibility relating to a digital VTR according to the third embodiment.

The digital VTR using the video recording system of the third embodiment has the upper compatibility to the digital VTR of a single mode corresponding to the standard mode. FIG. 17 is a diagram explaining the compatibility. The video recording system of the single mode VTR having the standard mode only is the system A (compression block size: 5 macroblocks), and the video recording system of the multi mode VTR is the system A (compression block size: 15 macroblocks, but including three sets of macroblock groups each composed of 5 macroblocks) in the standard mode, the system C in the long time mode, and the system D in the high precision mode. First, the image recorded in the single mode VTR (system A) can be reproduced in the standard mode of the multi mode VTR (system A'). Conversely, the image in the standard mode (system A') among the images recorded in the multi mode VTR (system A'/C/D) can be reproduced in the single mode VTR (system A). In the single mode VTR, the compression data are read in the record area unit of one compression block, that is, in the record area unit of one macroblock group in the multi mode VTR, but the greater part of the important compression data among the compression data of the 5 macroblocks are recorded therein.

When the image recorded in the standard mode of the multi mode VTR according to the third embodiment is reproduced in the single mode VTR, a part of the high frequency component of the compression data is deleted and thereby slight deterioration of the picture quality may occur. This is a phenomenon which does not occur in the case of the multi mode VTR according to the second embodiment, but there is hardly any problem in practice. The picture quality of the image being recorded and reproduced in the standard mode VTR according to the third embodiment is slightly better than that in the standard mode of the multi mode VTR according to the second embodiment. This is because the compression size is the 5 macroblocks in the latter, whereas it is the 15 macroblocks which is three times the 5 macroblocks in the former. The video recording system of the multi mode VTR having the upper compatibility to the single mode VTR is not limited to that in the second embodiment and the third embodiment as above described. For example, the standard mode of the multi mode VTR is further divided into 2 modes, and the video recording system of the first standard mode may be made quite the same as the video recording system of the single mode VTR and the second standard mode may be made another video recording system having high matching property with the long time mode and the high precision mode.

Figure 18A:
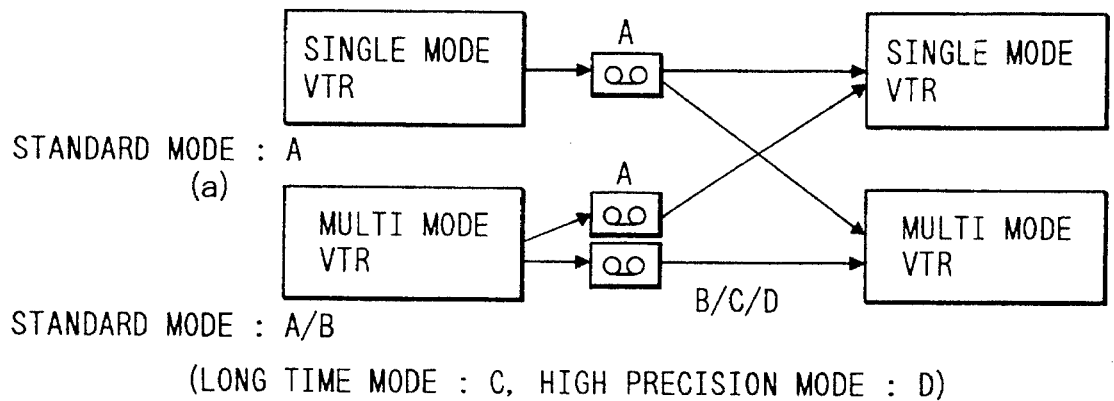
FIGS. 18A and 18B are diagrams indicating compatibility relating to a digital VTR according to further embodiments of the present invention.
Figure 18B:
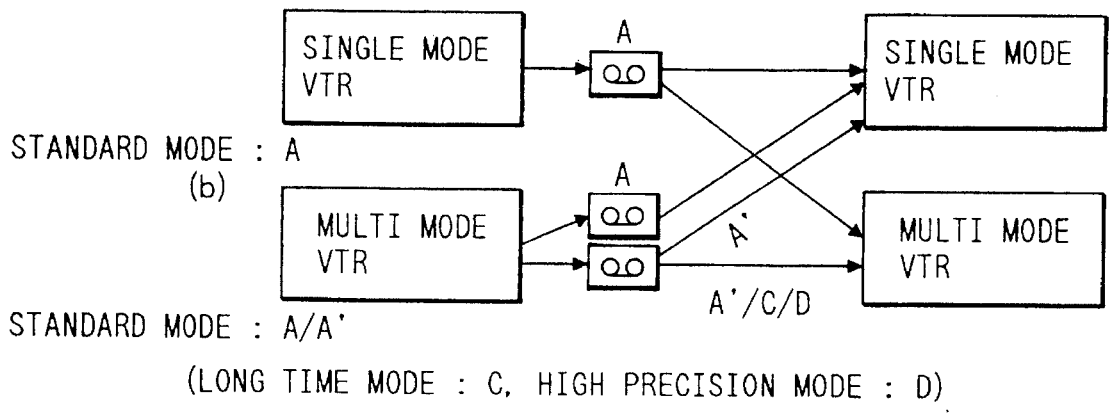

FIGS. 18A and 18B show diagrams explaining the compatibility in this case for two further embodiments. The video recording system of the single mode VTR having the standard mode only is the system A (compression block size: 5 macroblocks). In the case of the embodiment of FIG. 18A, the video recording system of the multi mode VTR is the system A in the first standard mode, the system B (compression block size: 15 macroblocks) in the second standard mode, the system C in the long time mode, and the system D in the high precision mode. First, the image recorded in the single mode VTR (system A) can be reproduced in the first standard mode (system A) of the multi mode VTR or the second standard mode (system B). Conversely, the image recorded in the first standard mode of the multi mode VTR (system A) can be reproduced in the single mode VTR (system A). However, the image recorded in other operation modes of the multi mode VTR (system B/C/D) cannot be reproduced in the single mode VTR.

In the case of the embodiment of FIG. 18B, the video recording system of the multi mode VTR is the system A in the first standard mode, the system A' (compression block size: 15 macroblocks, but three sets of macroblock groups each composed of 5 macroblocks) in the second standard mode, the system C in the long time mode, and the system D in the high precision mode. First, the image recorded in the single mode VTR (system A) can be reproduced in the first standard mode (system A) of the multi mode VTR or the second standard mode (system A'). Conversely, the image recorded in the first standard mode of the multi mode VTR (system A) can be reproduced in the single mode VTR (system A). Further, the image in the second standard mode (system A') among the images recorded in other operation modes of the multi mode VTR (system A'/C/D) can be reproduced in the single mode VTR (system A).

Embodiments of the present invention have been described in detail. In the above-mentioned embodiments, although the data quantity recorded on one track is the same in all operation modes, even when the data quantity recorded on one track is different in each operation mode, the present invention can be applied similarly. When the greatest common measure of the data quantity regarding the images recorded on one track on the magnetic tape is defined as the reference data quantity, the compression block size in each operation mode may be determined, so that the number of the compression blocks per reference data quantity recorded to the magnetic tape in each operation mode becomes the same or is related by a simple integer ratio. Also in the case of the above-mentioned embodiments, although the picture coding system utilizing the DCT is adopted, even in other picture coding systems such as difference coding (DPCM), vector quantization (VQ), sub band coding or the like, the present invention, of course, can be applied similarly. Further in the case of the above-mentioned embodiments, although the pixel number of the color difference signal is ½ times in the horizontal direction and ½ times in the vertical direction with respect to the brightness signal and the macroblock pixel number is 16×16 pixels, even when the size of the macroblock in each operation mode is different from this, the present invention can be applied similarly. As the operation modes of the digital VTR, not only the standard mode, the long time mode, the high precision mode, but also other various operation modes may be considered, and the present invention can be easily applied to the digital VTR having any operation mode.

According to the video recording system of the present invention, in the digital VTR having a plurality of operation modes, such as plural sorts of video modes which is different in resolution or plural sorts of record modes which is different in picture quality and record time, since the compression block size in each operation mode is determined so that the compression data quantity per a compression block with the data quantity which is made constant in the picture coding processing becomes the same or is related by a simple integer ratio in all operation modes, a processing method such as error correction code adding to succeed the picture coding processing need not be changed in response to the operation mode, and the record reproducing of video signals corresponding to all operation modes can be realized efficiently in the simple processing.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A digital video signal recording and reproducing apparatus wherein a basic block is constituted by a plurality of pixels of video signals, comprising:

picture data compressing means for effecting data compression of the video signals so that a compression data quantity after data compression becomes a constant with respect to a compression block constituted by a plurality of the basic blocks;

recording means for recording the compressed data of the video signals on a data recording medium; and compression block setting means for setting a number of the basic blocks to constitute the compression block in response to different operation modes of the digital video signal recording and reproducing apparatus which are different in at least one of resolution of the video signals, recording time, and data compression system, the compression block setting means controlling the picture data compressing means so that the number of the compression blocks of the video signals recorded on one track of the data recording medium after data compression by the picture data compressing means becomes M in a first operation mode and becomes N in a second operation mode, M and N being positive integers which are different from one another; wherein the first operation mode is a long play mode and the second operation mode is a normal play mode.

2. An apparatus according to claim 1, wherein the compression block setting means sets the number of basic blocks so as to control the picture data compressing means so that the number of compression blocks recorded on one track is a positive integer in each of other operation modes.

3. An apparatus according to claim 2, wherein the compression block setting means sets the number of basic blocks so as to control the picture data compressing means so that the number of compression blocks recorded on one track in each of one of the second and other operation modes is one of 135, 45, 27, 15, 5, and 3.

4. An apparatus according to claim 2, further comprising basic block rearranging means provided at an input of the picture data compressing means for rearranging an order of the basic blocks of the video signals to effect data compression in sequence so that the basic blocks of the video signals subjected to data compression in sequence by the picture data compressing means are non-adjacent to an immediately preceding basic block subjected to data compression in a position of the video signals within a frame.

5. An apparatus according to claim 2, further comprising compressed data dividing means for dividing the compressed data of one compression block output from the picture data compressing means into L groups of compressed data, where a group is constituted by compressed data of K basic blocks, where L and K are positive integers, so as to enable recording of compressed data of the one compression block on a data record domain on the track in groups of group record domains of equal size; and divided compressed data rearranging means for rearranging the divided compressed data output from the compressed data dividing means so that a main portion of the compressed data of each group among the L groups is recorded to the group record domain allocated to each group and a remaining part other than the main portion of the compressed data of each group is recorded to other group record domains allocated to other groups;

wherein the recording means records the output of the divided compressed data rearranging means on the data recording medium; and wherein when the compressed data of the video signals from the data recording medium are reproduced by the digital video signal recording and reproducing apparatus having an operation mode wherein K basic blocks constitute the one compression block, at least the main portion of the compressed data of each group is subjected to data decompression so as to enable video reproduction.

6. A digital video signal recording and reproducing apparatus having a plurality of operation modes in which at least one of a resolution, a recording time of video signals and a data compression system is different, the video signals being data compressed in a unit of a basic block comprised of a plurality of pixels of video signals to record data on a data recording medium, comprising:

picture data compressing means for data compressing the video signals so that a compression data quantity after data compression becomes a constant with respect to a compression block constituted by a plurality of the basic blocks;

recording means for recording the compressed data of the video signals on a data recording medium;

compression block setting means for setting a number of the basic blocks to constitute the compression block in response to the different operation modes of the digital video signal recording and reproducing apparatus and for controlling the picture data compressing means so that the number of the compression blocks of the video signals recorded on one track of the data recording medium after data compressing becomes an integer in each operation mode; and basic block rearranging means provided at an input of the picture data compressing means for rearranging an order of the basic blocks of the video signals within a frame according to a common standard in all operation modes so that the basic blocks to be data compressed in sequence by the picture data compressing means are not adjacent to an immediately preceding basic block which has been data compressed in the position of the video signals within a frame.

7. A digital video signal recording and reproducing apparatus according to claim 6, wherein one operation mode is a long play mode and another operation mode is a normal play mode, and the integer number of said compression blocks on one track of the data recording medium is different from each other in the different operation modes.

8. A digital video signal recording and reproducing apparatus according to claim 6, wherein said basic block rearranging means includes means which is common in all operation modes for vertically dividing a frame of the video signals by the number of tracks of the recording medium to be used for recording the frameof the video signals, horizontally dividing the frame of the video signals by the number of basic blocks constituting one compression block, and generating segments, each of the segments consisting of a number of basic blocks equal to the number of compression blocks recorded on one track after data compression.

9. A digital video signal recording and reproducing apparatus according to claim 6, further comprising:

compressed data dividing means for dividing the compressed data of one compression block output from the picture data compressing means into a plurality of groups of compressed data, where a group is constituted by compressed data of an integer number of the basic blocks, so as to record the compressed data of one compression block on a data record domain on the track in groups of group record domains of equal size; and divided compressed data rearranging means for rearranging the divided compressed data output from the compressed data dividing means so that a main portion of the compressed data of each group is recorded to the group record domain of equal size allocated to each group and a remaining part other than the main portion of the compressed data of each group is recorded to other group record domains allocated to other groups;

wherein the recording means records the output of the divided compressed data rearranging means on the data recording medium.

10. A digital video signal recording and reproducing apparatus according to claim 9, wherein the digital video signal recording and reproducing apparatus has a reproducing operation mode wherein at least said main portion of the compressed data is subjected to data decompression so as to reproduce the video signals.

11. A digital video signal recording and reproducing apparatus according to claim 6, wherein said basic block rearranging means defines, from all said basic blocks constituting one frame of said video signals, a secondary dimensional matrix having a number of columns equal to a number of the basic blocks constituting one compression block and a number of rows equal to a number of tracks for recording compression data in one frame, and defines a common standard for rearranging said basic blocks in all operation modes with respect to said secondary dimensional matrix.

12. A digital video signal recording and reproducing system comprising the digital video signal recording and reproducing apparatus according to claim 6.

13. A digital video signal recording and reproducing system comprising the digital video signal recording and reproducing apparatus according to claim 11.

14. A digital video signal recording and reproducing method having a plurality of operation modes in which at least one of a resolution, a recording time of video signals and a data compression system is different, the video signals being data compressed in a unit of a basic block comprised of a plurality of pixels of the video signals to record data on a data recording medium, the method comprising the steps of:

data compressing the video signals so that a compression data quantity after data compression becomes a constant with respect to a compression block constituted by a plurality of the basic blocks;

recording the compressed data of the video signals on a data recording medium;

setting a number of the basic blocks to constitute the compression block in response to said different operation modes of the digital video signal recording and reproducing apparatus and controlling the picture data compressing so that the number of the compression blocks of the video signals recorded on one track of the data recording medium after data compression becomes an integer in each operation mode; and rearranging an order of the basic blocks of the video signals within a frame according to a common standard in all operation modes so that the basic blocks to be data compressed in sequence are not adjacent to an immediately preceding basic block which has been data compressed in the position of the video signals within a frame.

15. A digital video signal recording and reproducing method according to claim 14, wherein one operation mode is a long play mode and another operation mode is a normal play mode.

16. A digital video signal recording and reproducing method according to claim 14, further comprising the step which is common in all operation modes of vertically dividing a frame of the video signals by the number of tracks of the recording medium to be used for recording the frame of the video signals, horizontally dividing the frame of the video signals by the number of basic blocks constituting one compression block, and generating segments, each of the segments consisting of a number of basic blocks equal to the number of compression blocks recorded on one track after data compression.

17. A digital video signal recording and reproducing method having a plurality of operation modes in which at least one of a resolution, a recording time of video signals, and a data compression system is different, the video signals being data compressed in a unit of a basic block comprised of a plurality of pixels of the video signals to record data on a data recording medium, the method comprising the steps of:

data compressing the video signals so that a compression data quantity after data compression becomes a constant with respect to a compression block constituted by a plurality of the basic blocks;

setting a number of the basic blocks to constitute the compression block in response to said different operation modes, and controlling the data compressing step so that the number of the compression blocks of the video signals recorded on one track of the data recording medium after data compression becomes an integer in each operation mode;

rearranging an order of the basic blocks of the video signals within a frame according to a common standard in all operation modes so that said basic blocks to be data compressed in sequence are not adjacent to an immediately preceding basic block which has been data compressed in the position of the video signals within a frame;

dividing the compressed data of one compression block produced by the data compressing step into a plurality of groups of compressed data, where a group is constituted by compressed data of an integer number of the basic blocks, so as to enable recording of compressed data of one compression block on a data record domain on the track in groups of group record domains of equal size;

rearranging the divided compressed data produced by the compressed data dividing step so that a main portion of the compressed data of each group is recorded to the group record domain of equal size allocated to each group and a remaining part other than the main portion of the compressed data of each group is recorded to other group record domains allocated to other groups; and recording the rearranged divided compressed data produced by the divided compressed data rearranging step on a data recording medium.

* * * * *